US011513994B2

(12) United States Patent
Mishra et al.

(10) Patent No.: US 11,513,994 B2
(45) Date of Patent: Nov. 29, 2022

(54) TIMED-TRIGGER SYNCHRONIZATION ENHANCEMENT

(71) Applicant: QUALCOMM Incorporated, San Diego, CA (US)

(72) Inventors: Lalan Jee Mishra, San Diego, CA (US); Umesh Srikantiah, San Diego, CA (US); Richard Dominic Wietfeldt, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 86 days.

(21) Appl. No.: 17/148,953

(22) Filed: Jan. 14, 2021

(65) Prior Publication Data

US 2022/0222200 A1 Jul. 14, 2022

(51) Int. Cl.
*G06F 13/42* (2006.01)
*G06F 9/30* (2018.01)
*G06F 13/362* (2006.01)
*G06F 13/40* (2006.01)

(52) U.S. Cl.
CPC ...... *G06F 13/4295* (2013.01); *G06F 9/30101* (2013.01); *G06F 13/3625* (2013.01); *G06F 13/4054* (2013.01)

(58) Field of Classification Search
CPC ............. G06F 13/4295; G06F 9/30101; G06F 13/3625; G06F 13/4054
See application file for complete search history.

(56) References Cited

U.S. PATENT DOCUMENTS

| 2009/0044276 A1* | 2/2009 | Abdel-Aziz | H04L 63/1425 711/E12.091 |
| 2011/0197278 A1* | 8/2011 | Chow | H04L 63/1416 726/24 |
| 2019/0347239 A1* | 11/2019 | Mishra | G06F 13/4291 |
| 2020/0019209 A1 | 1/2020 | Sharpe-Geisler | |
| 2020/0133910 A1 | 4/2020 | Rodd et al. | |

OTHER PUBLICATIONS

International Search Report and Written Opinion—PCT/US2021/061465—ISA/EPO—dated Mar. 25, 2022.

* cited by examiner

*Primary Examiner* — Zachary K Huson
(74) *Attorney, Agent, or Firm* — Qualcomm Incorporated

(57) ABSTRACT

Systems, methods, and apparatus improve synchronization of trigger timing when triggers are configured over a serial bus. A data communication apparatus has an interface circuit that couples the data communication apparatus to a serial bus and is configured to receive a clock signal from the serial bus, a plurality of counters configured to count pulses in the clock signal, and a controller configured to receive a datagram from the serial bus, the datagram including a plurality of data bytes corresponding to the plurality of counters, configure each of the plurality of counters with a count value based on content of a corresponding data byte when the corresponding data byte is received from the datagram, cause each of the counters to refrain from counting until all of the counters have been configured with count values, and actuate a trigger when a counter associated with the trigger has counted to zero.

30 Claims, 17 Drawing Sheets

TIMED-TRIGGER SYNCHRONIZATION ENHANCEMENT

TECHNICAL FIELD

The present disclosure relates generally to serial communication over a shared serial bus and, more particularly, to optimizing timing of time-critical triggers initiated by transmissions over the shared serial bus.

BACKGROUND

Mobile communication devices may include a variety of components including circuit boards, integrated circuit (IC) devices and/or System-on-Chip (SoC) devices. The components may include processing devices, user interface components, storage and other peripheral components that communicate through a shared data communication bus, which may include a multi-drop serial bus or a parallel bus. General-purpose serial interfaces known in the industry include the Inter-Integrated Circuit (I2C or $I^2C$) serial interface and its derivatives and alternatives.

The Mobile Industry Processor Interface (MIPI) Alliance defines standards for the Improved Inter-Integrated Circuit (I3C) serial interface, the Radio Frequency Front-End (RFFE) interface, the System Power Management Interface (SPMI) and other interfaces. These interfaces may be used to connect processors, sensors and other peripherals, for example. In some interfaces, multiple bus masters are coupled to the serial bus such that two or more devices can serve as bus master for different types of messages transmitted on the serial bus. SPMI protocols define a hardware interface that may be implemented between baseband or application processors and peripheral components. In some instances, SPMI protocols are implemented to support power management operations within a device.

The RFFE interface provides a communication interface that may be used for controlling various radio frequency (RF) front-end devices, including power amplifier (PA), low-noise amplifiers (LNAs), antenna tuners, filters, sensors, power management devices, switches, and the like. These devices may be collocated in a single IC device or provided in multiple IC devices. In a mobile communication device, multiple antennas and radio transceivers may be provided to support multiple concurrent RF links. In some instances, a serial bus may enable one device to trigger an action in another device at a precise time. There is an ongoing need to support accurate and reliable triggers, initiated, enabled or managed through serial buses.

SUMMARY

Certain aspects of the disclosure relate to systems, apparatus, methods and techniques that can improve synchronization of triggers that are configured and/or initiated through transmissions over a serial bus. In one aspect of the disclosure, complexity of trigger timing can be reduced by disabling counters or timers until counters or timers for a set of triggers have been loaded with count values. In one aspect of the disclosure, counters may be enabled to begin counting clock pulses when a bus park condition is detected or until all counters associated with a group of triggers have been loaded with count values.

In various aspects of the disclosure, a method for managing triggering in a device coupled to a serial bus includes receiving a datagram from the serial bus, the datagram including a plurality of data bytes corresponding to a plurality of counters, configuring each of the plurality of counters with a count value based on content of a corresponding data byte when the corresponding data byte is received from the datagram, causing each of the plurality of counters to refrain from counting until all of the plurality of counters have been configured with count values, and actuating a trigger when a counter associated with the trigger has counted to zero.

In various aspects of the disclosure, a data communication apparatus has an interface circuit adapted to couple the data communication apparatus to a serial bus and configured to receive a clock signal from the serial bus, a plurality of counters configured to count pulses in the clock signal, and a controller configured to receive a datagram from the serial bus, the datagram including a plurality of data bytes corresponding to the plurality of counters, configure each of the plurality of counters with a count value based on content of a corresponding data byte when the corresponding data byte is received from the datagram, cause each of the plurality of counters to refrain from counting until all of the plurality of counters have been configured with count values, and actuate a trigger when a counter associated with the trigger has counted to zero.

In various aspects of the disclosure, a processor-readable storage medium has one or more instructions stored thereon which, when executed by at least one processor of a processing circuit in a receiver, cause the at least one processor to receive a datagram from the serial bus, the datagram including a plurality of data bytes corresponding to a plurality of counters, configure each of the plurality of counters with a count value based on content of a corresponding data byte when the corresponding data byte is received from the datagram, cause each of the plurality of counters to refrain from counting until all of the plurality of counters have been configured with count values, and actuate a trigger when a counter associated with the trigger has counted to zero.

In various aspects of the disclosure, a data communication apparatus has means for receiving a datagram from the serial bus, the datagram including a plurality of data bytes corresponding to a plurality of counters, means for controlling a plurality of counters, each of the plurality of counters being configured with a count value based on content of a corresponding data byte when the corresponding data byte is received from the datagram, and means for actuating a trigger when a counter associated with the trigger has counted to zero. The means for controlling the plurality of counters may be configured to cause each of the plurality of counters to refrain from counting until all of the plurality of counters have been configured with count values.

DETAILED DESCRIPTION

Figure 1:
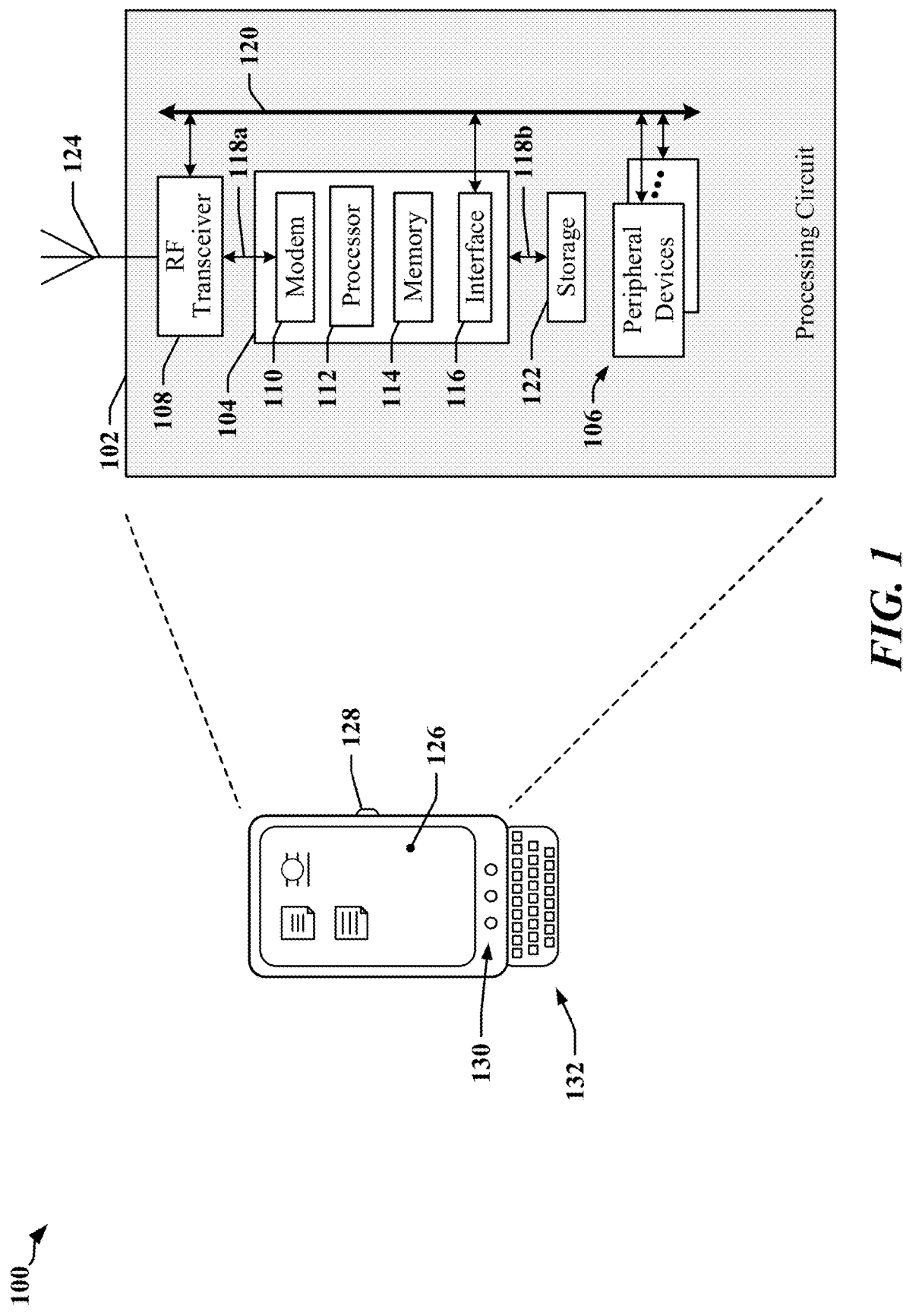
FIG. 1 illustrates an apparatus employing a data link between IC devices that is selectively operated according to one of a plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Overview

Devices that include application-specific IC (ASIC) devices, SoCs and/or other IC devices often employ a shared communication interface that may include a serial bus or other data communication link to connect processors with modems and other peripherals. The serial bus or other data communication link may be operated in accordance with multiple standards or protocols defined. For example, the serial bus may be operated in accordance with an I2C, I3C, SPMI, and/or RFFE protocol, or other protocols including a protocol that may be configured for half-duplex operation. Increased utilization of serial buses, and/or the imposition of more stringent timing constraints in support of applications, peripherals and sensors can result in demand for reduced transmission latencies. Transmission latency may include the time required to terminate a transaction in process on the serial bus, bus turnaround (between transmit mode and receive mode), bus arbitration and/or command transmissions specified by protocol.

Certain operations in a radio frequency IC (RFIC) require very low-latency communications. For example, configuration and reconfiguration of circuits used to drive multiple antennas may generate large volumes of messages, commands and signaling directed to multiple RF components. In many instances, the messages may include configuration parameters that are to be applied at a time determined by a controlling device. In some instances, triggers may be sent to activate a configuration defined by previously provided configuration parameters. In one example, triggers may be sent to initiate or actuate a sequence of configurations or actions in a radio frequency device according to a defined timeline.

Certain aspects disclosed herein relate to timing issues that can arise when triggers are preconfigured and actuated based on timers or counters. For example, triggers may be implemented by transmitting trigger configuration information before the desired trigger actuation time and initiating one or more timers to define a time of actuation, whereby the triggers are actuated when the timers expire. In conventional systems, the timers may be implemented using a counter clocked by a clock signal provided by the bus master. The counters are loaded with count values and the triggers are activated, actuated or fired when the counters reach zero or overflow. The bus master provides the clock signal during idle periods and while a transaction is being conducted through the serial bus.

In one example, a method for managing triggering in a device coupled to a serial bus includes receiving a datagram from the serial bus, the datagram including a plurality of data bytes corresponding to a plurality of counters, configuring each of the plurality of counters with a count value based on content of a corresponding data byte when the corresponding data byte is received from the datagram, causing each of the plurality of counters to refrain from counting until all of the plurality of counters have been configured with count values, and actuating a trigger when a counter associated with the trigger has counted to zero.

Certain aspects disclosed herein may be applicable to a serial bus operated in accordance with an I2C, I3C, SPMI, and/or RFFE protocol, or other protocol. Certain aspects are applicable to a serial bus operated in half-duplex mode or full-duplex mode. Certain aspects are applicable to point-to-point interfaces including UART-based interfaces, line multiplexed UART (LM-UART) interfaces, and virtual GPIO (VGI) and messaging interfaces. Certain aspects are applicable to multipoint interfaces and/or interfaces when operated in point-to-point mode.

Examples of Apparatus that Employ Serial Data Links

According to certain aspects of this disclosure, a serial data link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similarly functioning device.

FIG. 1 illustrates an example of an apparatus 100 that employs at least one data communication link. The apparatus 100 may include a processing circuit 102 that has multiple circuits or devices 104, 106 and/or 108 and that may be implemented in one or more ASICs or in an SoC. In one example, the apparatus 100 may be a communication device and the processing circuit 102 may include a processing device provided in an ASIC 104, one or more peripheral devices 106, and a transceiver 108 that enables the apparatus to communicate through an antenna 124 with a radio access network, a core access network, the Internet and/or another network.

The ASIC 104 may have one or more processors 112, one or more modems 110, on-board memory 114, a bus interface circuit 116 and/or other logic circuits. The processing circuit 102 may be controlled by an operating system that may provide an application programming interface (API) layer that enables the one or more processors 112 to execute software modules residing in the on-board memory 114 or other processor-readable storage 122 provided on the processing circuit 102. The software modules may include instructions and data stored in the on-board memory 114 or in the processor-readable storage 122. The ASIC 104 may access its on-board memory 114, the processor-readable storage 122, and/or storage external to the processing circuit 102. The on-board memory 114 and/or the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 and/or an integrated or external keypad 132, among other components. A user interface module may be configured to operate with the display 126, external keypad 132, etc. through a dedicated communication link or through one or more serial data interconnects.

The processing circuit 102 may provide or be coupled to one or more buses 118a, 118b, 120 that enable communication between certain devices 104, 106, and/or 108. In one example, the ASIC 104 may include a bus interface circuit 116 that is implemented using a combination of circuits, counters, timers, control logic and other configurable circuits or modules. In one example, the bus interface circuit 116 may be configured to operate in accordance with standards-defined communication specifications or protocols. The processing circuit 102 may include or control a power management function that configures and manages the operation of the apparatus 100.

Figure 2:
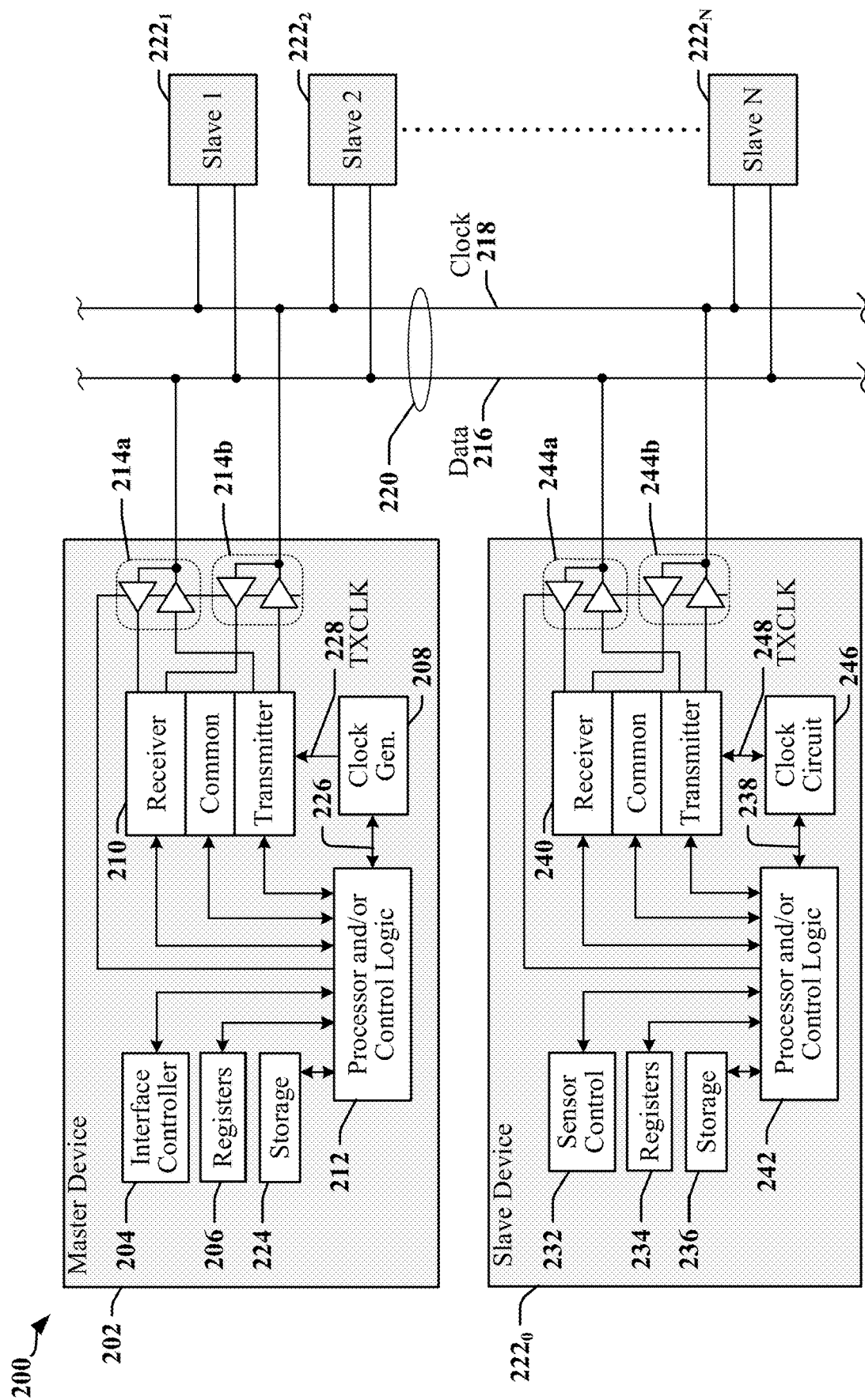
FIG. 2 illustrates a system architecture for an apparatus employing a data link between IC devices.

FIG. 2 illustrates certain aspects of an apparatus 200 that includes multiple devices 202, and $222_0$-$222_N$ coupled to a serial bus 220. The devices 202 and $222_0$-$222_N$ may be implemented in one or more semiconductor IC devices, such as an application processor, SoC or ASIC. In various implementations, the devices 202 and $222_0$-$222_N$ may include, support or operate as a modem, a signal processing device, a display driver, a camera, a user interface, a sensor, a sensor controller, a media player, a transceiver, and/or other such components or devices. In some examples, one or more of the slave devices $222_0$-$222_N$ may be used to control, manage or monitor a sensor device. Communication between devices 202 and $222_0$-$222_N$ over the serial bus 220 is controlled by a bus master device 202. Certain types of bus can support multiple bus master devices 202.

In one example, a bus master device 202 may include an interface controller 204 that manages access to the serial bus, configures dynamic addresses for slave devices $222_0$-$222_N$ and/or generates a clock signal 228 to be transmitted on a clock line 218 of the serial bus 220. The bus master device 202 may include configuration registers 206 or other storage 224, and other control logic 212 configured to handle protocols and/or higher-level functions. The control logic 212 may include a processing circuit having a processing device such as a state machine, sequencer, signal processor or general-purpose processor. The bus master device 202 includes a transceiver 210 and line drivers/receivers 214a and 214b. The transceiver 210 may include receiver circuits, transmitter circuits and common circuits, where the common circuits may include timing, logic and storage circuits and/or devices. In one example, the transmitter circuits encode and transmit data based on timing in the clock signal 228 provided by a clock generation circuit 208. Other timing clock signals 226 may be used by the control logic 212 and other functions, circuits or modules.

At least one device $222_0$-$222_N$ may be configured to operate as a slave device on the serial bus 220 and may include circuits and modules that support a display, an image sensor, and/or circuits and modules that control and communicate with one or more sensors that measure environmental conditions. In one example, a slave device $222_0$ may provide a control function, module or circuit 232 that includes circuits and modules to support a display, an image sensor, and/or circuits and modules that control and communicate with one or more sensors that measure environmental conditions. The slave device $222_0$ may include configuration registers 234 or other storage 236, control logic 242, a transceiver 240 and line drivers/receivers 244a and 244b. The control logic 242 may include a processing circuit that has a processing device such as a state machine, sequencer, signal processor or general-purpose processor. The transceiver 240 may include receiver circuits, transmitter circuits and common circuits, where the common circuits may include timing, logic and storage circuits and/or devices. In one example, the transmitter circuits encode and transmit data based on timing in a clock signal 248 provided by clock generation and/or recovery circuits 246. The clock signal 248 may be derived from a signal received from the clock line 218. Other timing clock signals 238 may be used by the control logic 242 and other functions, circuits or modules.

The serial bus 220 may be operated in accordance with RFFE, I2C, I3C, SPMI, or other protocol. In some instances, two or more devices 202, $222_0$-$222_N$ may be configured to operate as a bus master device on the serial bus 220.

Figure 3:
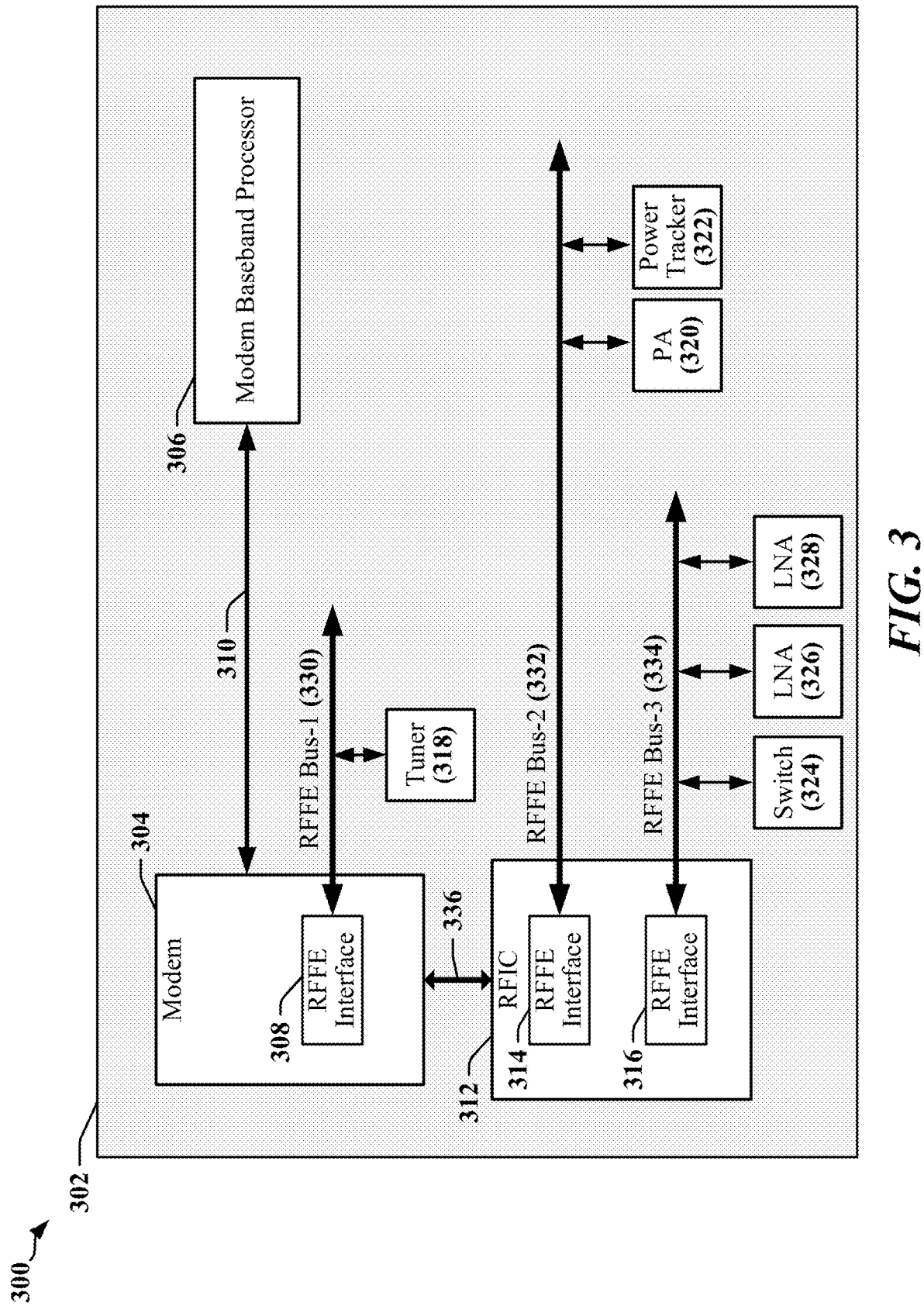
FIG. 3 illustrates a device configuration for coupling various radio frequency front-end devices using multiple RFFE buses.

FIG. 3 illustrates certain aspects of an apparatus 300 that includes multiple RFFE buses 330, 332, 334 configured coupled to various RF front-end devices 318, 320, 322, 324, 326, 328. A modem 302 includes an RFFE interface 308 that couples the modem 302 to a first RFFE bus 330. The modem 302 may communicate with a baseband processor 306 and a Radio-Frequency IC (RFIC 312) through one or more communication links 310, 336. The illustrated apparatus 300 may be embodied in one or more of a mobile communication device, a mobile telephone, a mobile computing system, a mobile telephone, a notebook computer, a tablet computing device, a media player, a gaming device, a wearable computing and/or communications device, an appliance, or the like.

In various examples, the apparatus 300 may be implemented with one or more baseband processors 306, modems 304, RFICs 312, multiple communications links 310, 336, multiple RFFE buses 330, 332, 334 and/or other types of buses. The apparatus 300 may include other processors, circuits, modules and may be configured for various operations and/or for a variety of functionalities. In the example illustrated in FIG. 3, the modem 302 is coupled to an RF tuner 318 through its RFFE interface 308 and the first RFFE bus 330. The RFIC 312 may include one or more RFFE interfaces 314, 316, controllers, state machines and/or processors that can configure and control certain aspects of the RF front-end. The RFIC 312 may communicate with a PA 320 and a power tracking module 322 through a first of its RFFE interfaces 314 and the second RFFE bus 330. The RFIC 312 may communicate with a switch 324 and one or more LNAs 326, 328.

Bus latency can affect the ability of a serial bus to handle high-priority, real-time and/or other time-constrained messages. Low-latency messages, or messages requiring low bus latency, may relate to sensor status, device-generated real-time events and virtualized general-purpose input/output (GPIO). In one example, bus latency may be measured as the time elapsed between a message becoming available for transmission and the delivery of the message or, in some instances, commencement of transmission of the message. Other measures of bus latency may be employed. Bus latency typically includes delays incurred while higher priority messages are transmitted, interrupt processing, the time required to terminate a datagram in process on the serial bus, the time to transmit commands causing bus turnaround between transmit mode and receive mode, bus arbitration and/or command transmissions specified by protocol.

In certain examples, latency-sensitive messages can include coexistence messages. Coexistence messages are transmitted in a multisystem platform to prevent or reduce instances of certain device types impinging on each other, including for example, switches 324, LNAs 326, 328, PAs 320 and other types of device that operate concurrently in a manner that can generate inter-device interference, or that could potentially cause damage to one or more active devices through high-power electromagnetic interference. Devices that may interfere with one another may exchange coexistence management (CxM) messages to permit each device to signal imminent actions that may result in interference or conflict. CxM messages may be used to manage operation of shared components including a switch 324, LNA 326, 328, PA 320 and/or an antenna.

Multi-drop interfaces such as interfaces governed by RFFE, SPMI, I3C, and similar protocols can reduce the number of physical input/output (I/O) pins used to communicate between multiple devices. Protocols that support communication over a multi-drop serial bus define a datagram structure used to transmit command, control and data payloads. Datagram structures for different protocols define certain common features, including addressing used to select devices to receive or transmit data, clock generation and management, interrupt processing and device priorities. The example of RFFE protocols may be employed to illustrate certain aspects disclosed herein. However, the concepts disclosed herein are applicable to other serial bus protocols and standards.

Figure 4:
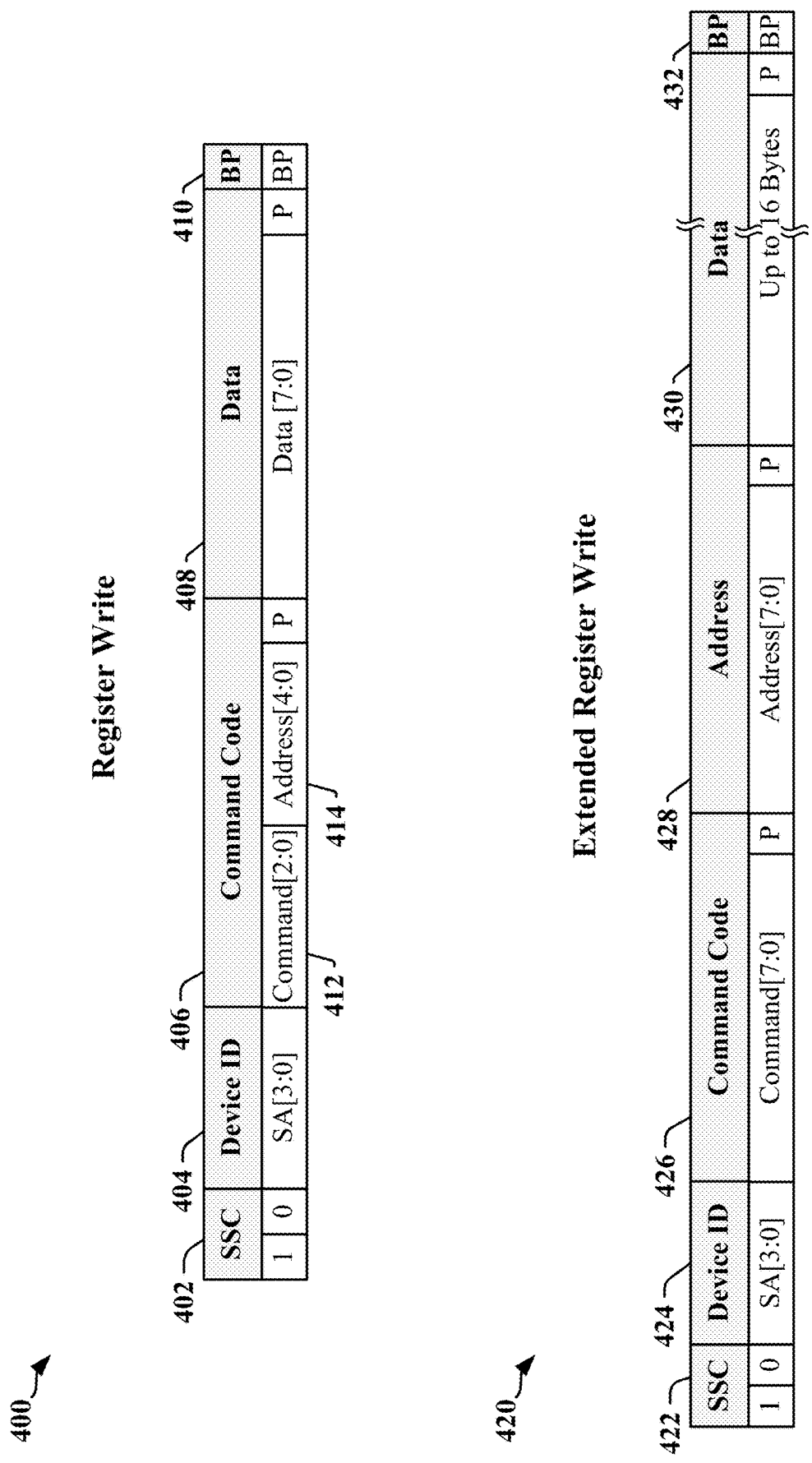
FIG. 4 illustrates datagram structures defined by RFFE protocols.

FIG. 4 illustrates examples of datagram structures 400, 420 that are consistent with structures defined by RFFE protocols. The datagram structures 400, 420 are also consistent with, or similar to datagram structures defined by other protocols and may be adapted for use in accordance with certain aspects disclosed herein. The datagram structures 400, 420 commence with transmission of a two-bit start sequence condition (the SSC 402 or 422) followed by a four-bit device identifier (the Device ID 404 or 424). A nine-bit command field 406, 426 is transmitted next. In the Register Write command datagram structure 400, the nine-bit command field 406 includes a three-bit command code 412, a five-bit address field 414 and a parity bit. In the Extended Register Write command datagram structure 420, the nine-bit command field 406 is occupied by an eight-bit command code and a parity bit and followed by an address field 428 that carries an eight-bit register address and a parity bit. In the Register Write command datagram structure 400, a data field 408 carries a single data byte, while in the Extended Register Write command datagram structure 420 the data field 430 carries up to 16 data bytes. Each data byte is transmitted with a parity bit. Bus park signaling 410, 432 terminates the datagram structures 400, 420.

Figure 5:
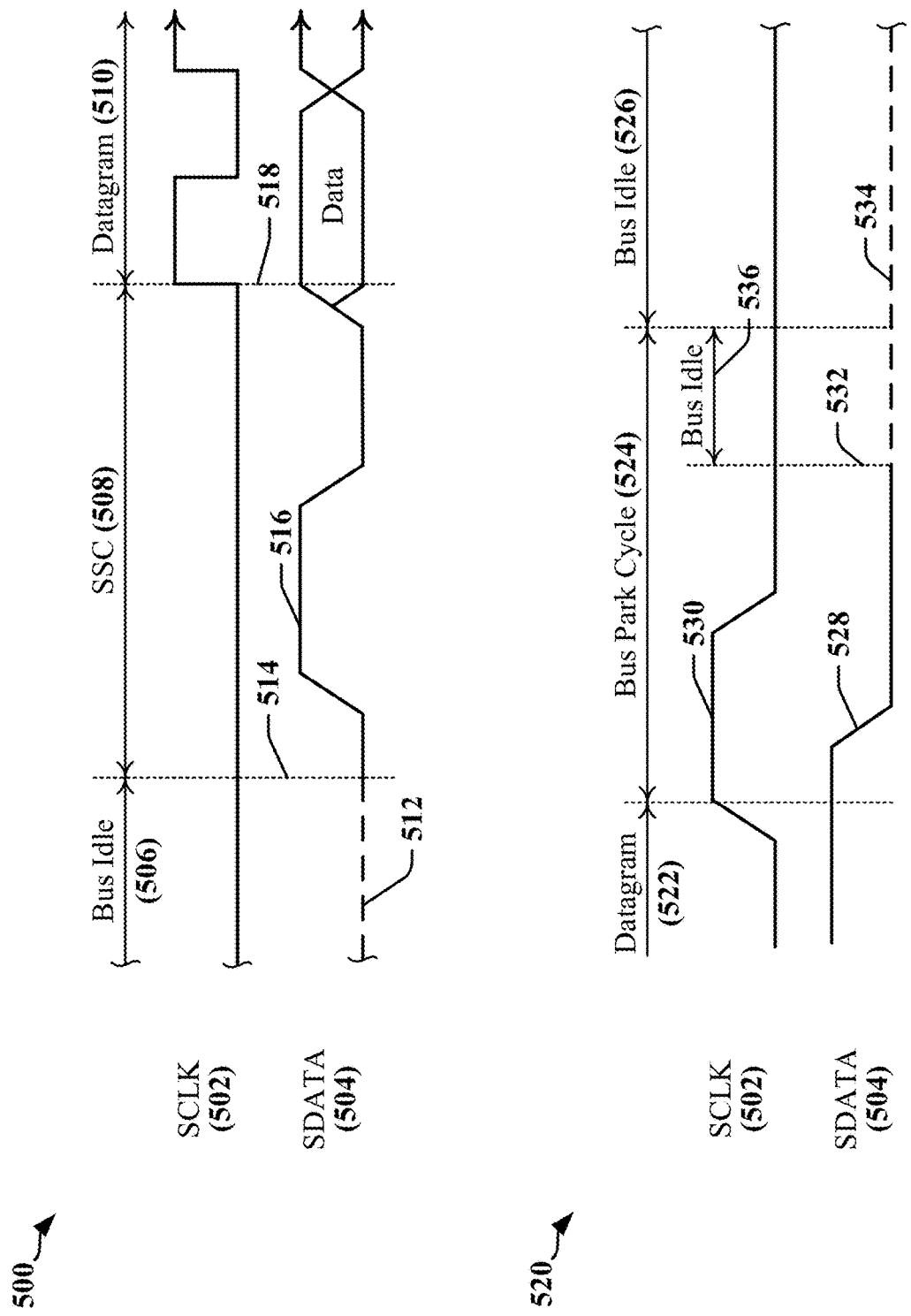
FIG. 5 illustrates signaling that is transmitted to delineate the boundaries of certain datagrams that may be adapted in accordance with certain aspects of this disclosure.

FIG. 5 includes timing diagrams 500, 520 that illustrate signaling that is transmitted to delineate the boundaries of SPMI or RFFE datagrams. The timing diagrams 500, 520 show the relative timing of signals transmitted on SCLK 502 and SDATA 504. The first timing diagram 500 illustrates timing of an SSC 508 that is transmitted to signal the start of a datagram 510. The SSC 508 is transmitted when the serial bus is in an idle state 506. In the idle state 506, SCLK 502 is driven at full strength by a bus master while slave devices coupled to the serial bus present a high impedance to SCLK 502. SCLK 502 is held in the low signaling state (here, at zero volts) by the bus master. In the idle state 506, SDATA 504 is weakly driven by the bus master and held or maintained in the weakly driven low signaling state 512. The weakly driven low signaling state 512 can easily be overcome by another line driver that can drive SDATA 504 at full strength.

In a conventional master-driven SSC 508, the bus master commences transmission of the SSC 508 at a first point in time 514 when it begins to drive SDATA 504 at full strength, initially at the low signaling state. The bus master then provides a pulse 516 on SDATA 504 while continuing to drive SCLK 502 to the low signaling state. The pulse 516 has duration of at least one cycle of a clock signal provided on SCLK 502 during transmission of a datagram 510. At a second point in time 518, the bus master commences transmission of clock pulses on SCLK 502, thereby providing the clock signal used to control or indicate timing of a datagram 510 transmitted on SDATA 504.

The second timing diagram 520 illustrates timing of a bus park cycle (the BPC 524) that may be transmitted to signal the termination of a datagram 522, for example. The BPC 524 is transmitted by providing a falling edge 528 on SDATA 504 while SCLK 502 is in a high signaling state 530. Transitions on SDATA 504 are permitted in the low portion of the clock signal during transmission of the datagram 522, and the falling edge 528 in FIG. 5 is clearly recognizable as BPC 524 signaling. The falling edge 528 is provided by the bus master driving SDATA 504 low at full strength. The bus master then drives SCLK 502 low and continues to drive SCLK 502 at full strength through subsequent bus idle intervals 526, 536. After driving SCLK 502 low, the bus master initiates a bus idle interval 536 at a time 532 when the bus master causes SDATA 504 to enter the weakly driven low signaling state 534. The BPC 524 is terminated and the serial bus enters a bus idle interval 526 until the next datagram is ready for transmission.

Triggers Transmitted Over a Multidrop Bus

Triggers provide a mechanism for RF front-end control, and triggers may be used to coordinate activities of different front-end components. For example, triggers can be used for a variety of purposes including beam steering or beamforming, gain setting, antenna path multiplexer control, etc. In some devices, triggers can be configured, activated and/or actuated over a serial bus operated in accordance with RFFE protocols. Trigger actuation may also be referred to as trigger firing. In one example, a trigger in a first device is actuated or fired after expiration of a timer, which may be configured and initiated by a second device. Actuation or firing of the trigger may initiate or cause an action to be taken in a circuit of the first device or by an application or function executed at the first device. In some examples, the trigger may be considered to have been actuated or fired when it causes an interrupt, signals an event, generates a message sets a flag, changes a register setting and/or enables one or more devices or circuits through an enable signal.

In some examples, a Bus Owner Master (BoM) may transmit a command that includes a trigger configuration and an action associated with the configured trigger, such that receipt of the command causes the trigger to be actuated or otherwise take effect or be applied. A trigger configured by the command may be referred to as a self-actuating trigger.

Advances in RF technology and the introduction of increased capabilities in communication devices increase pressure on latency times. For example, the deployment of radio access technologies such as the 5G New Radio technology defined by the 3rd Generation Partnership Project (3GPP) and the 802.11ax WLAN standard defined by the Institute of Electrical and Electronics Engineers (IEEE) 802.11 Working Group can require a 50% reduction in latency at conventional bus clock frequencies, and necessitate increased complexity of RFFE bus architectures and may increase the potential for traffic congestion on the bus. RFFE bus congestion and timing bottlenecks may be expected to exacerbate coexistence issues. For example, increased bus activity may increase bus contention issues where RFFE bus timing is complicated. In these and other scenarios, a BoM may be prevented from sending triggers at the exact time needed by slave devices to meet the RF protocol timing.

In some systems, delayed triggers may be used to avoid bus congestion and timing bottlenecks and to ensure timely actuation of triggers. A BoM may configure one or more triggers and corresponding timers that control the actual timing of the configured triggers. For example, the BoM may define an action associated with the configured triggers and may configure or activate one or more counters or timers cause the triggers to be actuated at the desired time. Actuating a trigger causes or initiates the action associated with the trigger. The counter or timer may define the time of actuation as a number of clock cycles in the clock signal transmitted by the BoM to control timing on the serial bus.

Figure 6:
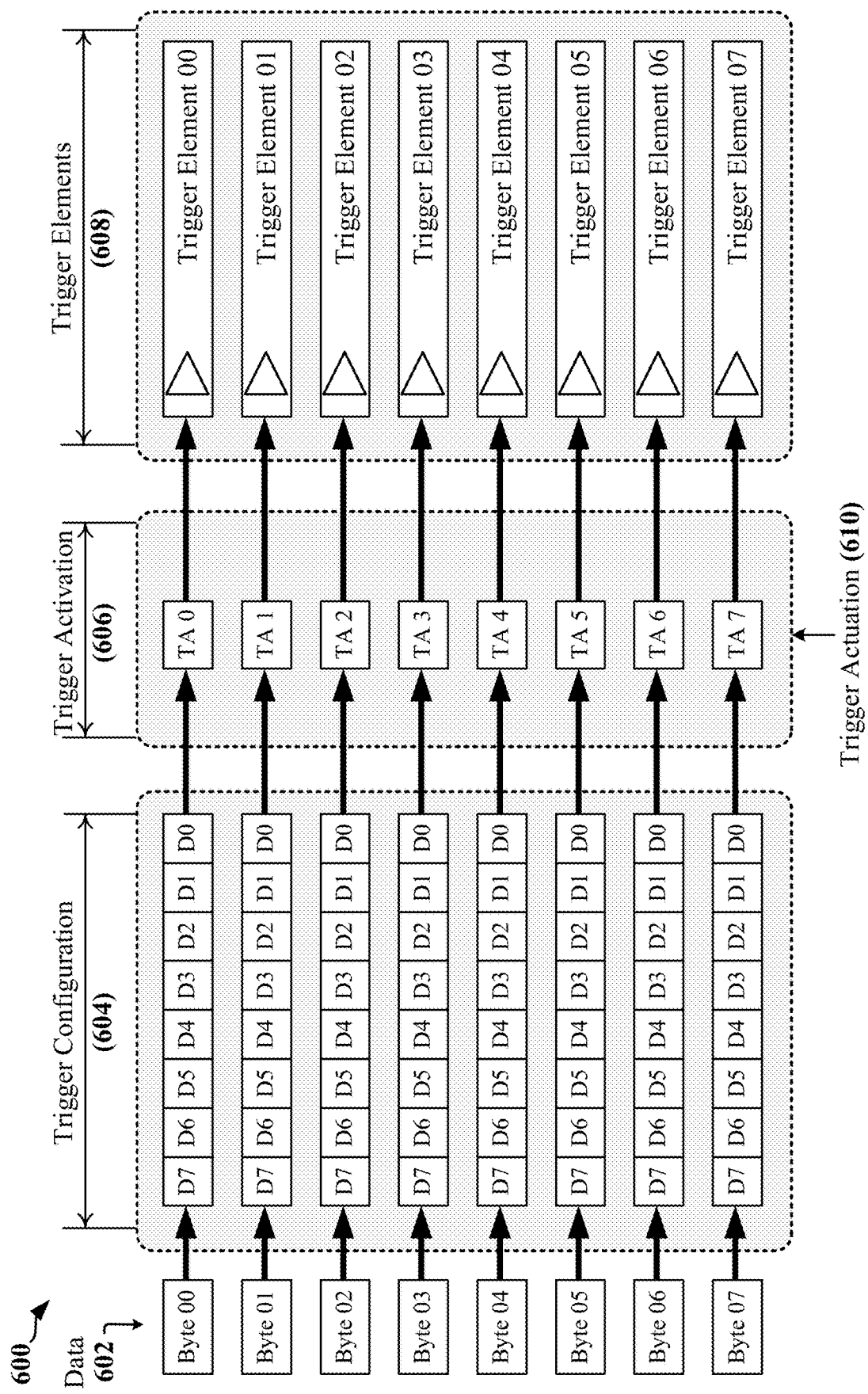
FIG. 6 illustrates actuation of triggers in accordance with certain aspects disclosed herein.

FIG. 6 illustrates an example of a trigger actuation circuit 600 that may be used to configure, activate and actuate triggers. In the illustrated example, configuration information is received as a plurality of data bytes 602, which may be stored in trigger configuration registers 604. The trigger configuration registers 604 may be written through a configuration transaction conducted over a serial bus. The serial bus may be operated in accordance with an RFFE protocol, for example. The contents of the trigger configuration registers 604 may be forwarded to a target address, register or device in accordance with a trigger actuation signal 610 provided by a corresponding timer or counter. In one example, the timer or counter may be provided in a controlling circuit that is configured based on information provided by the BoM.

Trigger activation logic 606 may be configured to enable the contents of the trigger configuration registers 604 to be transferred to respective target devices in response to a trigger command or trigger actuation signal 610 provided by the controlling circuit. The trigger elements 608 may include switches 324, LNAs 326, 328, PAs 320 and other types of device in an RF front-end. In one example, a BoM may configure a mask or gating logic that determines which trigger elements 608 are to receive data from the trigger configuration registers 604 during actuation initiated by a single trigger actuation signal 610. In another example, the mask or gating logic may determine the trigger elements 608 that are to receive data from the trigger configuration registers 604 during actuation initiated by corresponding trigger actuation signals 610.

Certain aspects disclosed herein provide mechanisms that enable a BoM to configure triggers with reliable delayed actuation. The triggers can be configured before the time defined for actuation, and a slave device may wait for a defined period of time before actuating the trigger. In one example, the BoM can send triggers ahead of time and when bus traffic conditions allow. A slave device may include configurable counters or timers that provide trigger actuation signals 610 based on timing provided by a clock signal transmitted over the serial bus by the BoM.

Figure 7:
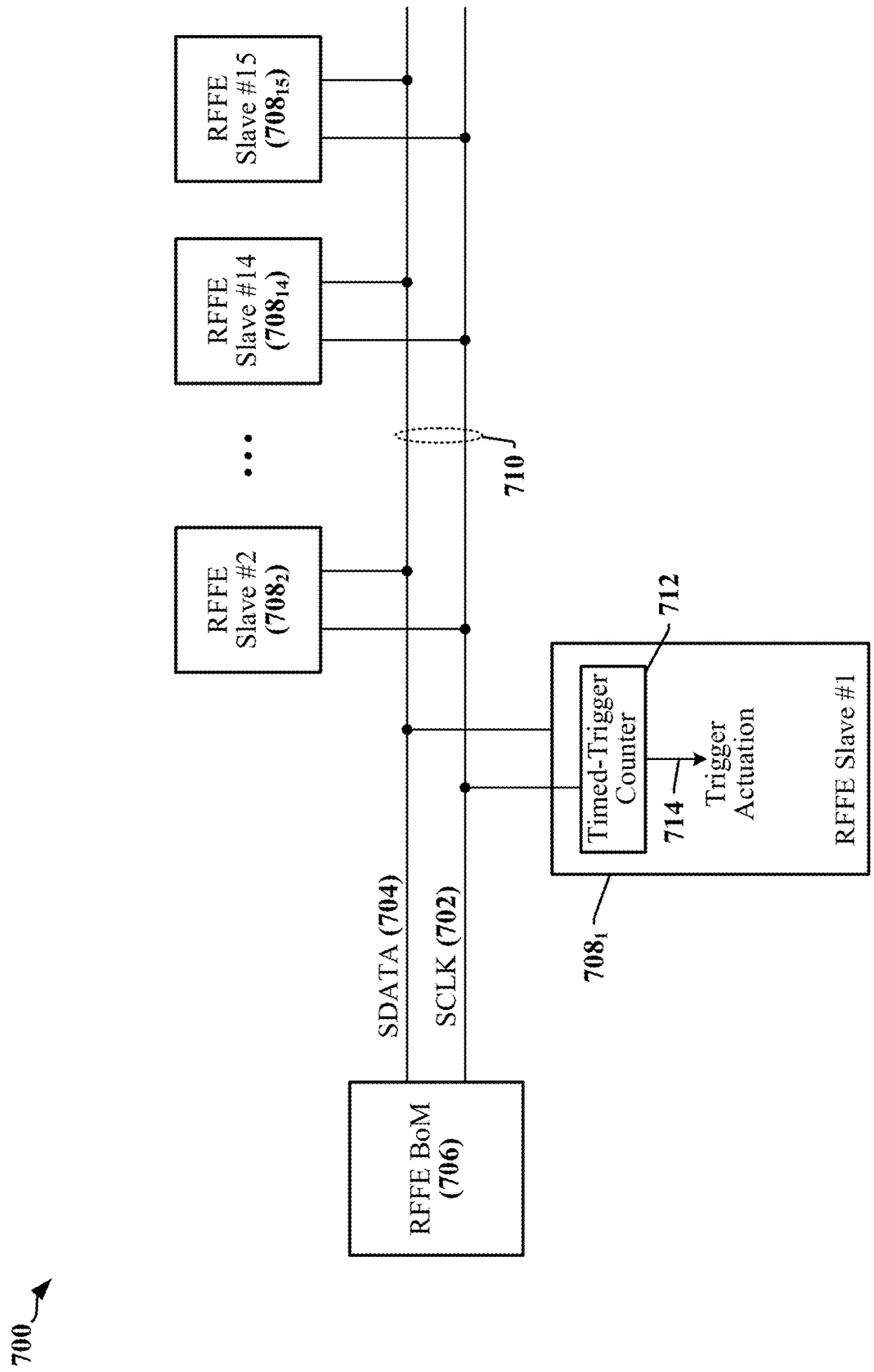
FIG. 7 illustrates an example of a system that may be configured in accordance with certain aspects disclosed herein.

FIG. 7 illustrates an example of a system 700 configured in accordance with certain aspects disclosed herein. In one example, the system 700 includes a serial bus 710 that may be operated in accordance with an RFFE protocol. A BoM 706 and up to 15 slave devices $708_1$-$708_{15}$ may be coupled to the serial bus 710. The serial bus 710 includes a first line (SCLK 702) that carries a clock signal and a second line (SDATA 704) that carries a data signal. A first slave device $708_1$, for example, includes or incorporates the trigger actuation circuit 600 of FIG. 6. The first slave device $708_1$ also includes a counter 712 that may be configured to provide an actuation signal 714. In one example, the counter 712 may be initially configured with a count value that is calculated to provide a desired or identified countdown period when the counter 712 is clocked by the clock signal transmitted on SCLK 702. The counter 712 may be configured to decrement in response to each pulse received from the clock signal, and may be further configured to provide the actuation signal 714 that causes an intended trigger to be fired when the count value reaches zero.

The BoM 706 may initiate or activate the intended trigger, and may be configured to provide clock pulses in a clock signal until the counter value has reached zero. The timing accuracy of the actuation signal 714 typically relies on the pulses being provided in the clock signal at a fixed rate or frequency. The BoM 706 may be configured to provide clock pulses in the clock signal while a transaction is conducted over the serial bus 710. For example, the BoM 706 provides clock pulses in the clock signal that define the timing of bits transmitted in a datagram transmitted over the serial bus 710. The BoM 706 continues to provide clock pulses in the clock signal when transmission of the datagram has been completed and when no further datagrams are available for transmission. The BoM 706 may idle SDATA 704 while continuing to drive the clock signal on SCLK 702. The pulses in the clock signal are provided at the same frequency as pulses provided during transmission of a datagram. The resulting clock signal causes the counter 712 to be decremented while the data signal is idle.

Certain RFFE protocols define a time-triggered architecture that corresponds to the trigger mechanisms described in relation to FIGS. 6 and 7. In many examples, a counter associated with a trigger begins to count down as soon as a countdown value is loaded. In a system that supports multiple triggers, two or more trigger counter are loaded using a common datagram. Each counter is loaded at a different point in time and the countdown operation begins at different times for each counter.

Figure 8:
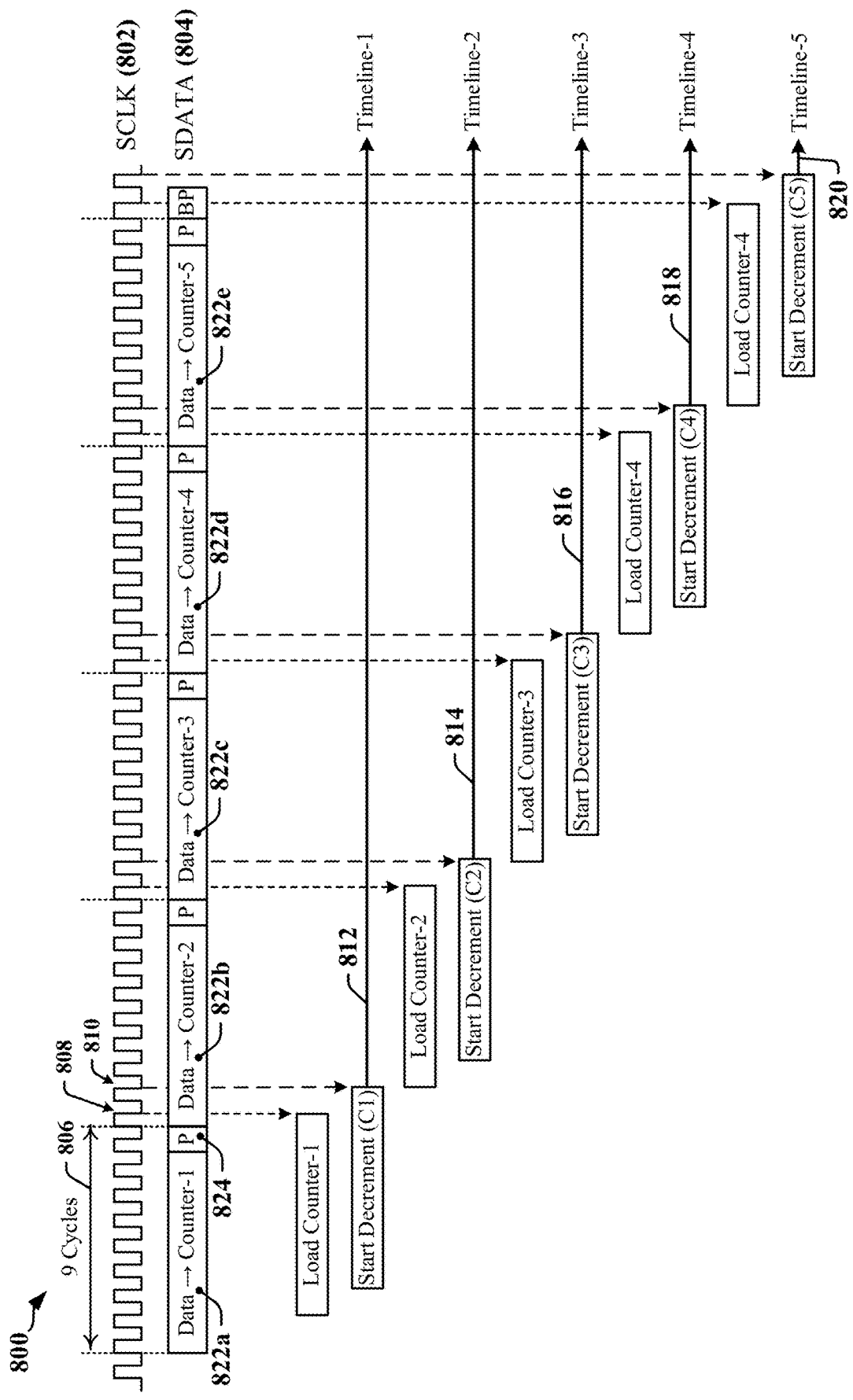
FIG. 8 illustrates an example of trigger timing in a system operated according to RFFE protocols.

FIG. 8 illustrates an example of trigger timing 800 in a system operated according to RFFE protocols. The trigger timing 800 is derived from a datagram that includes trigger information used to configure multiple triggers. A portion of the payload of the datagram is illustrated. The payload is transmitted on SDATA 804 in accordance with timing provided in a clock signal transmitted on SCLK 802. In the illustrated example, the payload includes five frames, each frame including an 8-bit data byte 822a-822e and an associated parity bit. The value of the data byte 822a-822e in each of the frames may be multiplied by 2 (i.e., shifted one bit) before being loaded into a corresponding counter.

In one example, a first-received frame is transmitted using 9 cycles 806 of the clock signal transmitted on SCLK 802. The data byte 822a may be multiplied by 2 and loaded into a first counter after a valid parity bit 824 is received. In the illustrated example, the first counter is loaded on the first falling edge 808 in the clock signal after the valid parity bit 824 is received. According to RFFE protocols, the counter begins a timeline 812 in which it counts down on each subsequent falling edge in the clock signal, including the next falling edge 810.

Each of the other data bytes 822b-822e is loaded into corresponding counters after their respective valid parity bit is received, and each counter begins counting down one clock cycle after being loaded. The timelines 812, 814, 816, 818, 820 have different start points and span different durations, while being expected to end at one or more points in time defined by an application or the BoM. In one example, an application may define a sequence of triggers to be actuated or fired commencing at a first point in time and ending at a second point in time, where each trigger is provided at a designated point in time that can be accurately measured relative to the first point in time or to the second point in time.

Timing accuracy may also be compromised by the use of timing offsets, since the use of multiplied values as counter values can introduce a one clock period variance in triggers initiated by pairs of counters. In one example, the first counter and the second counter in FIG. 8 may be used to initiate triggers at some point in time measured as N clock cycles after the second counter is loaded. The timeline 814 for the second counter starts 9 clock cycles before the timeline 818 for the third counter. The BoM may configure the values of the data bytes 822b and 822c to accommodate the offset between start times of the counters used to provide timing for delayed triggers. The first counter is loaded with a value N+M, while the second counter is loaded with a value N. The value of M is selected to account for the 9-cycle offset in timing between the start of counting by the two counters. The BoM can define the content of the data byte for the first counter as N/2+4 or N/2+5, to obtain a counter of value (after multiplication by 2) of N+8 or N+10. The value of N+9 is unobtainable under the described scheme.

In many systems, the overhead in calculating offsets for trigger timing may be further complicated when groups of triggers are defined. An application or BoM may define different groups of triggers, where each group of triggers is to be actuated or fired at the same point in time or with reference to the same point in time. Depending on trigger-grouping, the RFFE defined trigger procedures can result in a wide variation in the values to be loaded into the first-loaded counter. The variability in initial counter value can substantially increase procedural complexity for a single grouping within a set of triggers. Complexity increases further when multiple groups of triggers are defined and multiple initial values must be calculated for the first-loaded counters and/or when a timing relationship is defined between the groups of triggers.

Figure 9:
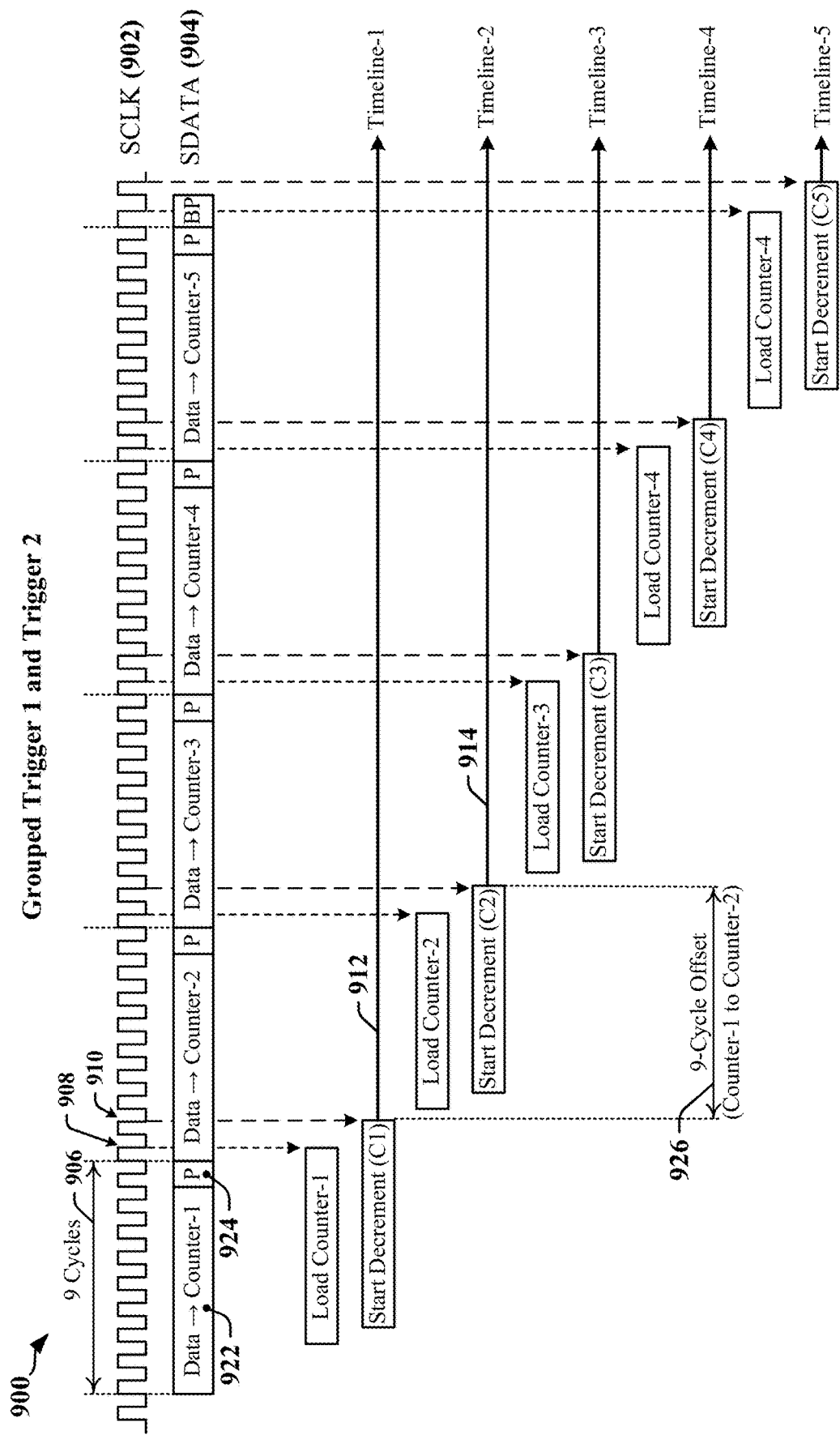
FIG. 9 illustrates a first example of group trigger timing in a system operated according to RFFE protocols.
Figure 10:
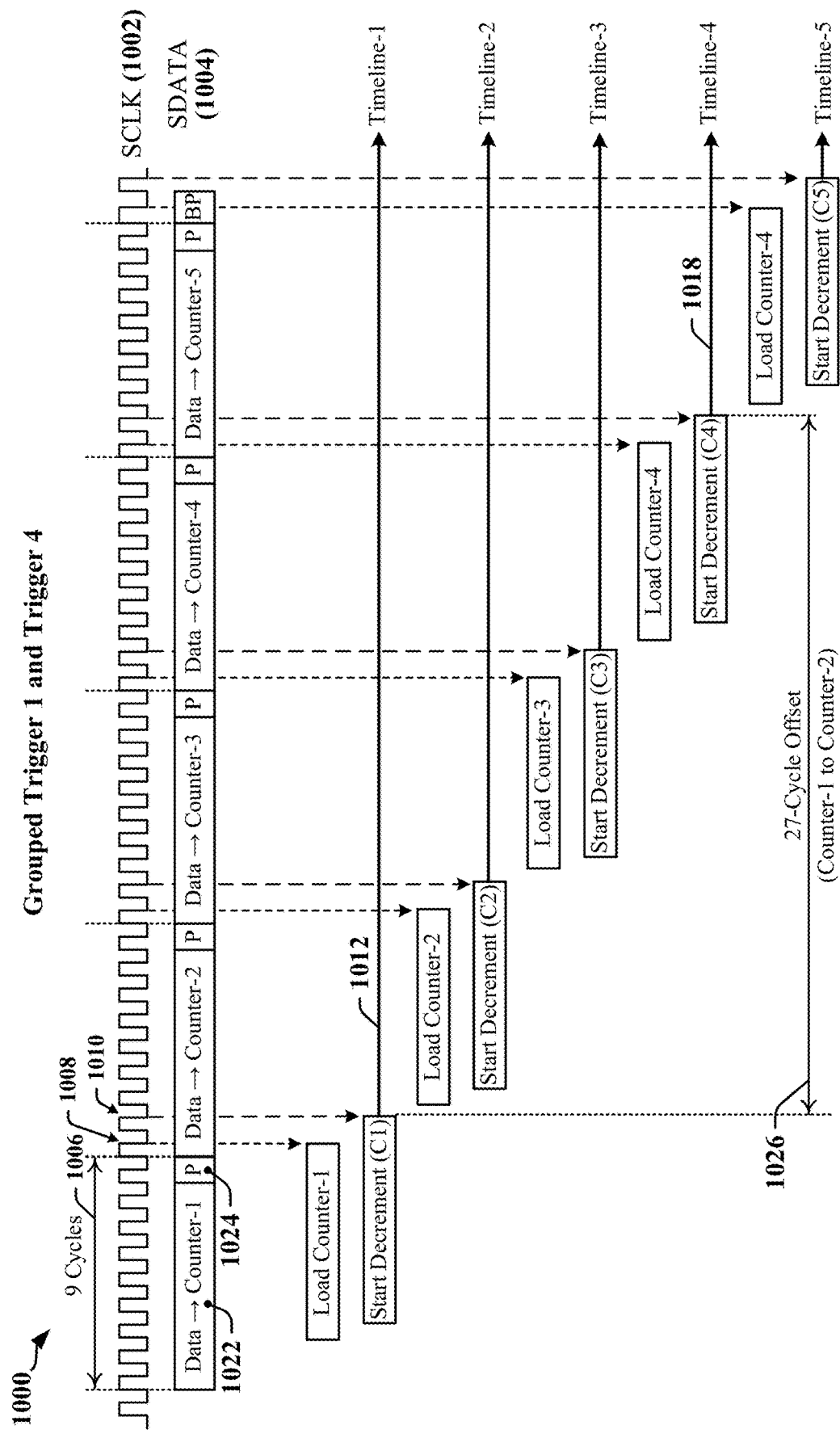
FIG. 10 illustrates a second example of group trigger timing in a system operated according to RFFE protocols.

FIGS. 9 and 10 illustrate variability in first-loaded counter values. FIG. 9 illustrates a first example of group trigger timing 900 in a system operated according to RFFE protocols. In this example, triggers 1 and 2 are grouped. FIG. 10 illustrates a second example of group trigger timing 1000 in a system operated according to RFFE protocols. In this example, triggers 1 and 4 are grouped.

Trigger timing 900, 1000 is derived from a datagram that includes trigger information used to configure at least two triggers. A portion of the payload of the datagram is illustrated. The payload is transmitted on SDATA 904, 1004 in accordance with timing provided in a clock signal transmitted on SCLK 902, 1002. In the illustrated examples, the payload includes five frames, each frame including an 8-bit data byte and an associated parity bit. The value of the data byte in each of the frames may be multiplied by 2 (i.e., shifted one bit) before being loaded into a corresponding counter.

A first-received frame is transmitted using 9 cycles 906, 1006 of the clock signal transmitted on SCLK 902, 1002. The data byte 922, 1022 carried by the first-received frame may be multiplied by 2 and loaded into a first counter after a valid parity bit 924, 1024 is received. The first counter is loaded on the first falling edge 908, 1008 in the clock signal after the valid parity bit 924, 1024 is received. According to RFFE protocol, the counter begins a timeline 912, 1012 in which it counts down on each subsequent falling edge in the clock signal, including the next falling edge 910, 1010.

One or more other data bytes are loaded into corresponding counters after their respective valid parity bit is received. In the example illustrated in FIG. 9, the next counter loaded is the second counter, which is used to fire a trigger that is grouped with the trigger fired by the first counter. The second counter begins counting down one clock after being loaded. The timelines 912 and 914 have different start points separated in time by a 9-clock cycle offset 926, and both timelines 912 and 914 are expected to end at the same point in time. In the example illustrated in FIG. 10, the fourth counter loaded is used to fire a trigger that is grouped with the trigger fired by the first counter. The fourth counter begins counting down one clock after being loaded. The timelines 1012 and 1018 have different start points separated in time by a 27-clock cycle offset 1026, and both timelines 1012 and 1018 are expected to end at the same point in time.

Calculation of counter values can become complex when different sequences of triggers may be requested and/or when the combination of counters used can vary between trigger requests. The BoM may first configure a counter value for each trigger and may then calculate offsets for each trigger based on a knowledge of the sequence in which registers are to be written. The relative start-point for count down operation can vary based on the number of counters to be loaded using one datagram.

Certain aspects of this disclosure provide trigger timing mechanisms that can remove or reduce the burden of computation and that can decrease hardware complexity needed to support the use of counters that are loaded with variable offset-adjusted values when one or more groups of triggers are defined.

In one aspect, trigger timing is controlled using BPC detection to gate counter operation.

Figure 11:
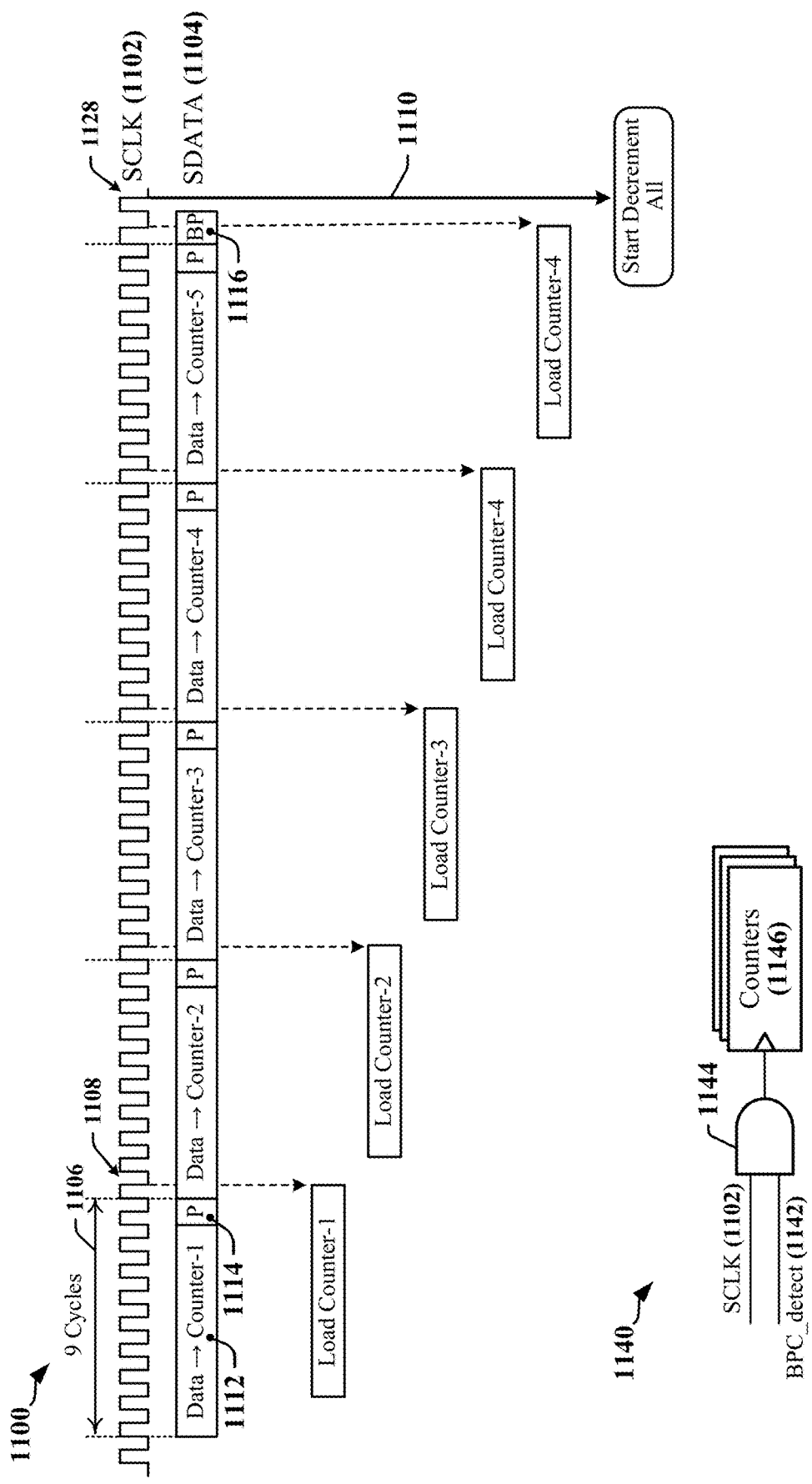
FIG. 11 illustrates a first example of trigger timing in a system configured in accordance with certain aspects of this disclosure.

FIG. 11 illustrates a first example of group trigger timing 1100 in a system configured in accordance with certain aspects of this disclosure. Trigger timing 1100 is derived from a datagram that includes trigger information used to configure at least two triggers. A portion of the payload of the datagram is illustrated. The payload is transmitted on SDATA 1104 in accordance with timing provided in a clock signal transmitted on SCLK 1102. In the illustrated example, the payload includes five frames, each frame including an 8-bit data byte and an associated parity bit. The value of the data byte in each of the frames may be multiplied by 2 (i.e., shifted one bit) before being loaded into a corresponding counter.

A first-received frame is transmitted using 9 cycles 1106 of the clock signal transmitted on SCLK 1102. The data byte 1112 carried by the first-received frame may be multiplied by 2 and loaded into a first counter after a valid parity bit 1114 is received. The first counter is loaded on the first falling edge 1108 in the clock signal after the valid parity bit 1114 is received. One or more data bytes are loaded into corresponding counters after their respective valid parity bit is received. The counters are prevented from counting until a BPC 1116 is detected 1110 at the end of the datagram. In the illustrated example, all counters begin counting down at the falling edge 1118 of the clock cycle following the BPC 1116.

The use of BPC timing to initiate countdown for all counters removes the need for the BoM to calculate offsets based on datagram configuration. All counters begin counting at the same time, and the countdown value represents the number of clock cycles between the BPC 1116 and the desired point at which the triggers are to be fired. Two or more counters may be configured with a common value when their corresponding triggers are to be fired at the same point in time.

FIG. 11 also illustrates a conceptual gating circuit 1140 that may be used in a system configured in accordance with certain aspects of this disclosure. Here, an AND gate blocks the clock signal received from SCLK 1102 while a BPC detect signal 1142 indicates that the BPC for the current datagram has not yet been detected. When the BPC for the current datagram is detected, the AND gate provides the clock signal received from SCLK 1102 to one or more counters 1146. In one example, the AND gate provides the clock signal received from SCLK 1102 to all counters 1146 that were loaded with count values carried in the current datagram. In another example, the AND gate provides the clock signal received from SCLK 1102 to all counters 1146 used to provide timing for a predefined or preconfigured group of triggers. In another example, the AND gate provides the clock signal received from SCLK 1102 to all counters 1146 in a block of counters. In some examples, the BPC detect signal 1142 may be latched or maintained until all of the counters 1146 have reached an end value, which may be a zero value in some implementations.

Figure 12:
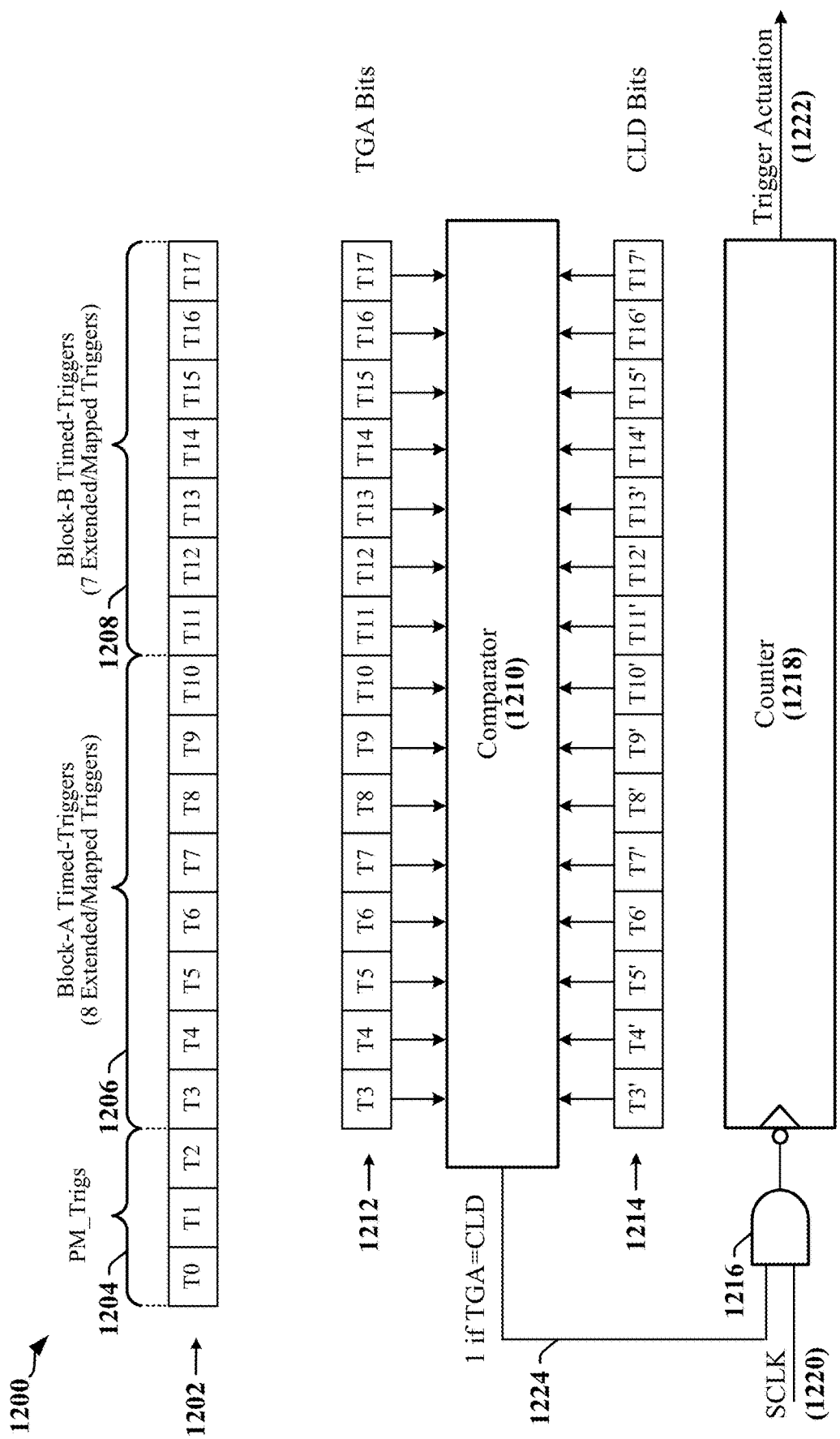
FIG. 12 illustrates an example of a group trigger timing counter provided in accordance with certain aspects of this disclosure.

In one aspect, trigger timing is controlled based on detection of completion of group counter loading. FIG. 12 illustrates an example of a group trigger timing counter 1200 in a system configured in accordance with certain aspects of this disclosure. A group trigger timing counter 1200 may be provided for each trigger supported by a device, such as an RFFE device or modem. RFFE protocols provide that each device may support up to 15 of the timed-triggers 1202, including "Block-A" timed triggers 1206 and "Block-B" timed triggers 1208. Time-trigger operations are not supported for power mode triggers 1204.

In one example, the group trigger timing counter 1200 includes a trigger group association register (the TGA register 1212) that provides up to 15 bits for mapping counters that are associated with a first group of triggers. These mapped counters are to be loaded when the first group of triggers is being configured. The device may include a counter-load detection register (the CLD register 1214) that identifies counters that have been loaded while the current datagram is being received. In one example, a CLD register 1214 may be shared by multiple group trigger timing counters 1200. In another example, a CLD register 1214 is provided for each group trigger timing counter 1200.

The group trigger timing counter 1200 includes a counter 1218 that is mapped to a trigger in the triggers 1206, 1208 that may be referred to as the trigger-of-interest. A comparator 1210 may be configured to determine when all counters associated with a group of triggers have been loaded based on bit settings in the TGA register 1212 and the CLD register 1214. In one example, each bit in the TGA register 1212 is mapped to a counter, and a bit that is set to logic 1 may be referred to as an active bit that represents a counter associated with a trigger belonging to the group of triggers that includes the trigger-of-interest. Each bit in the CLD register 1214 is mapped to a counter and each bit in the CLD register 1214 corresponds to a bit in the TGA register 1212. A bit in the CLD register 1214 may be set to logic 1 when its associated counter has been loaded. A bit in the CLD register 1214 set to logic 1 may be referred to as an active bit that represents a loaded counter. The comparator 1210 provides an output signal 1224 that is set to logic 1 when each bit in the CLD register 1214 corresponding to an active bit in the TGA register 1212 is active.

The output signal 1224 is provided to an AND gate 1216 that gates the clock signal transmitted on SCLK 1220. The AND gate 1216 passes the clock signal to the counter 1218 when the output signal 1224 is set to logic 1 causing the counter to count down until it reaches zero count value when the counter 1218 drives an output signal 1222 that fires the trigger-of-interest. All bits in the CLD register 1214 may be cleared when the trigger-of-interest is fired.

The use of group trigger timing counter 1200 enables the synchronization of multiple trigger activations and may enable the trigger activations to be fired without waiting for a BPC, thereby enabling the triggers to be fired in fewer clock ticks. Countdown commences at the same time for all counters associated with a group of triggers and the BoM need not calculate offsets based on datagram configuration. In various examples, two or more counters may be configured with a common value when their corresponding triggers are part of the same trigger group and are to be fired at the same point in time.

Figure 13:
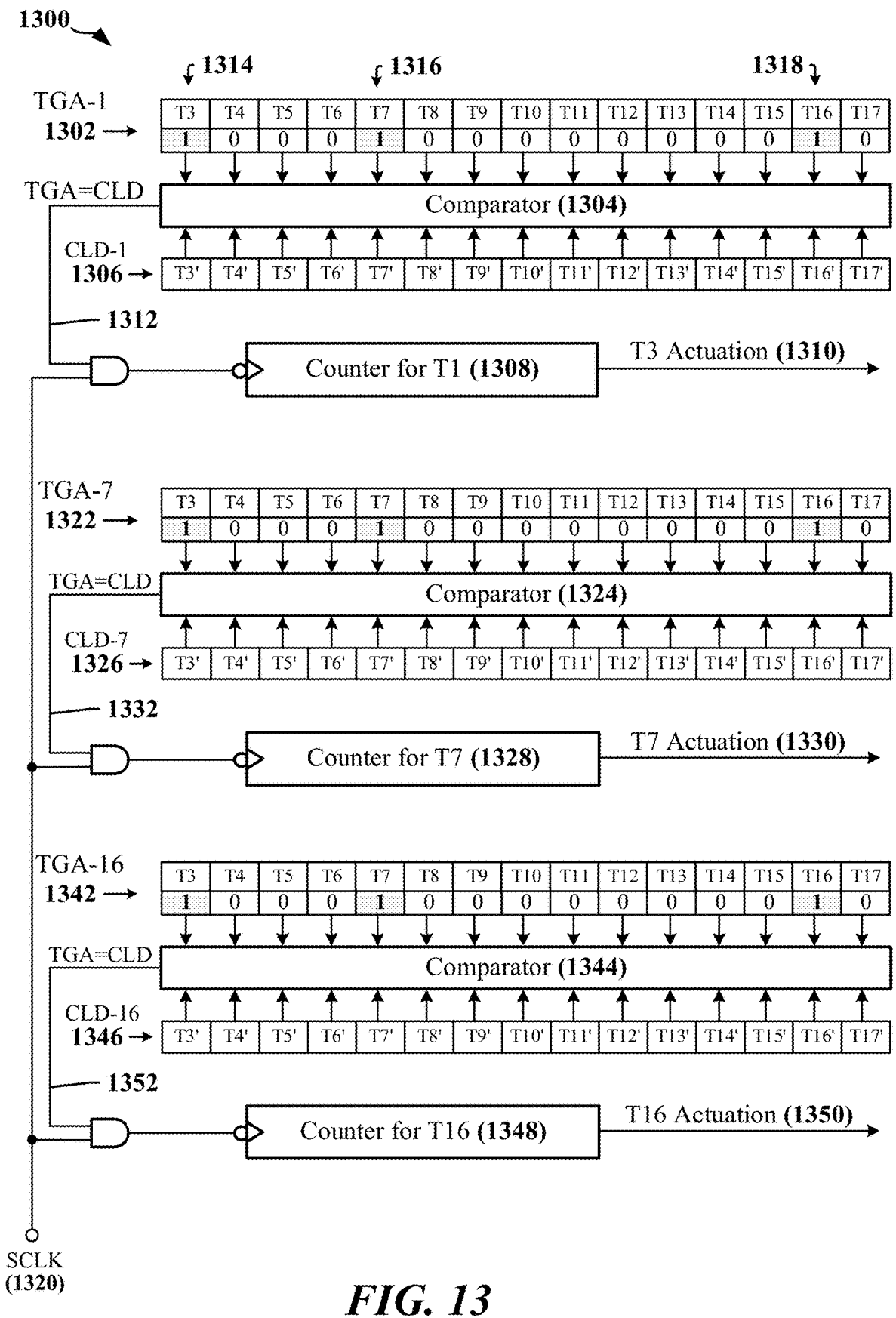
FIG. 13 illustrates an example of the use of the group trigger timing counter of FIG. 12.

FIG. 13 illustrates an example of the use of the group trigger timing counter 1200 of FIG. 12 in a system 1300 configured in accordance with certain aspects of this disclosure. Here, three triggers are grouped: Triggers T3, T7 and T16 are configured in a trigger group that is represented in the TGA registers 1302, 1322, 1342 used to control the counters 1308, 1328, 1348 associated with Triggers T3, T7 and T16. In each of the TGA registers 1302, 1322, 1342, the bit positions 1314, 1316, 1318 associated with Triggers T3, T7 and T16 are set to logic 1. The CLD registers 1306, 1326, 1346 are initially cleared and the outputs 1312, 1332, 1352 of the comparators 1304, 1324, 1344 are consequently at logic zero, gating the counters 1308, 1328, 1348. In some instances, one or more CLD registers may be shared by the comparators 1304, 1324, 1344.

Figure 14:
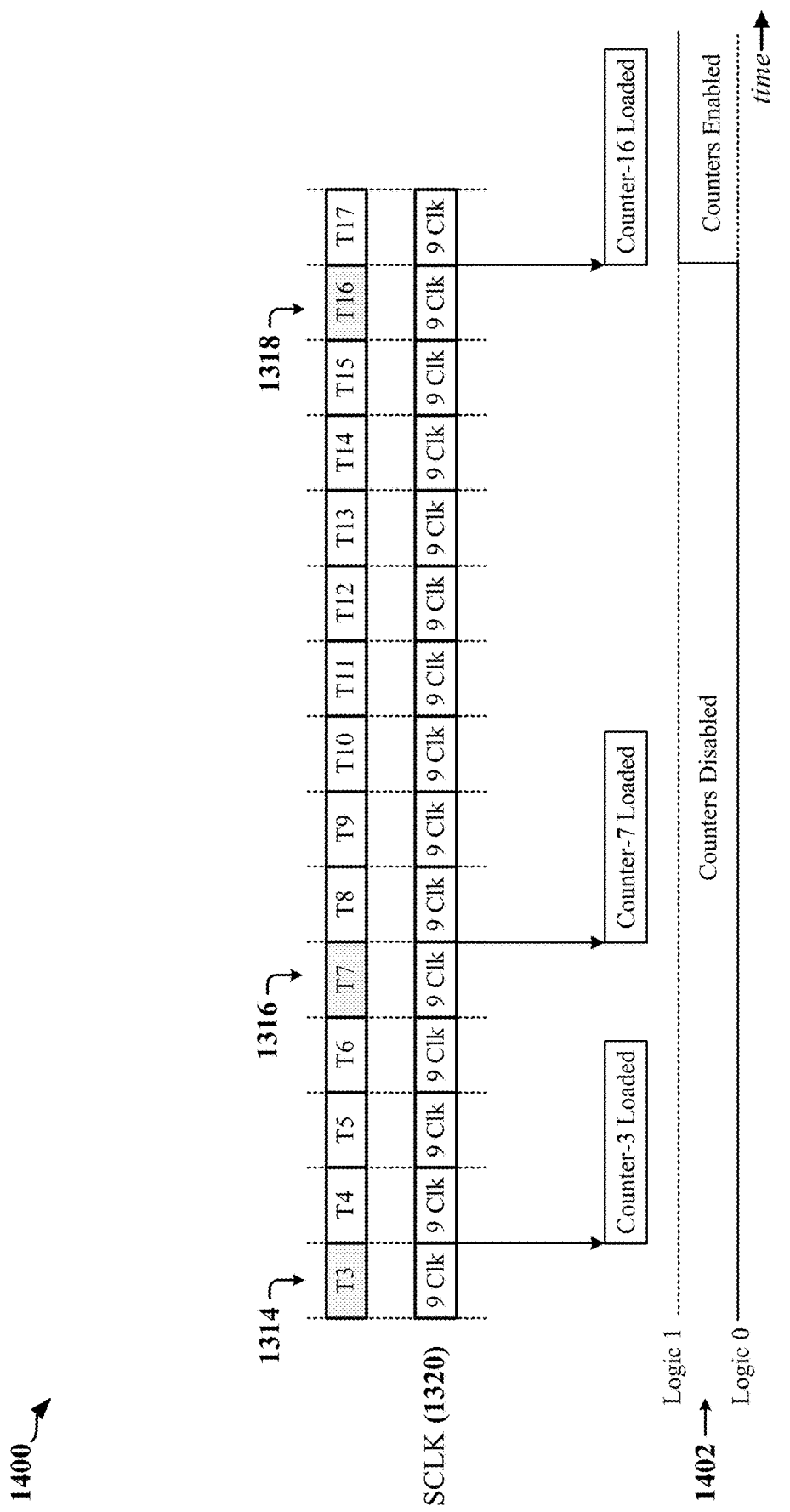
FIG. 14 illustrates an example of timing relayed to the use of the group trigger timing counter of FIG. 12.

The counters 1308, 1328, 1348 are loaded at different times, based on configuration or ordering of the datagram that carries counter values. FIG. 14 illustrates timing 1400 related to an example of the comparators 1304, 1324, 1344. In this example, the counters 1308, 1328, 1348 are loaded in order of the Triggers T3, T7 and T16. Other configurations of datagram, or RFFE interface addresses associated with the counters 1308, 1328, 1348 may enable different sequences of loading. In the illustrated example, the counter 1328 for T7 is loaded 36 clock cycles after the counter 1308 for T1, and the counter 1348 for T16 is loaded 81 clock cycles after the counter 1328 for T7. Each of the counters 1308, 1328, 1348 may be loaded with identical count values. The count values include no offsets associated with configuration or ordering of the datagram.

The clock signal transmitted on SCLK 1320 may be used for clocking the counters 1308, 1328, 1348 remains gated until all counters 1308, 1328, 1348 have been loaded. Count-down operation begins when all counters 1308, 1328, 1348 have been loaded, and the firing of Triggers T3, T7 and T16 is synchronized based on the values loaded in the counters 1308, 1328, 1348. All bits of the CLD registers 1306, 1326, 1346 are automatically cleared when Triggers T3, T7 and T16 have been fired. The outputs 1310, 1330, 1350 of the counters 1308, 1328, 1348 are provided to activation circuits and may be used to activate, fire or actuate corresponding triggers.

In some implementations, a device may include one TGA register and one CLD register in order to support a single group of triggers. The single group of triggers may be provided to set gain, control antenna path multiplexers, adjust phase shifters and support other functions associated with beam steering or beamforming. In some implementations, multiple TGA registers may be used with multiple CLD registers to support multiple trigger groups that have greater timing flexibility. In some implementations, multiple TGA registers may be used with one CLD register to support multiple trigger groups with certain restrictions on trigger timing. For example, the use of a single CLD register can limit variations in timing between trigger groups since the CLD register is cleared after all triggers have been fired. In other implementations, flexibility can be provided in single-CLD register configurations using masking and/or using a CLD register in which bit settings can be cleared independently based on individual trigger firing.

Examples of Processing Circuits and Methods

Figure 15:
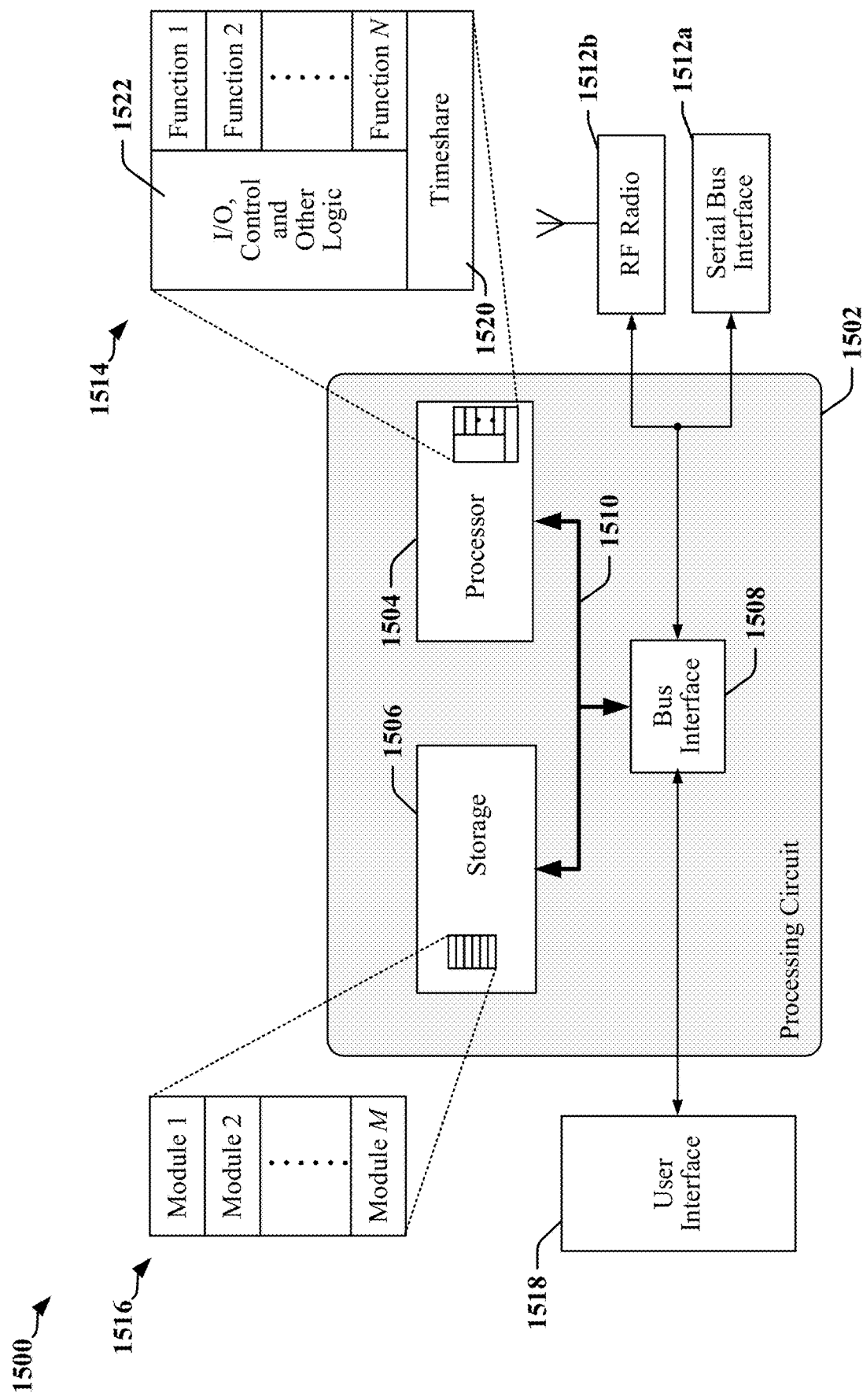
FIG. 15 illustrates an example of an apparatus employing a processing circuit that may be adapted according to certain aspects disclosed herein.

FIG. 15 is a diagram illustrating an example of a hardware implementation for an apparatus 1500. In some examples, the apparatus 1500 may perform one or more functions disclosed herein. In accordance with various aspects of the disclosure, an element, or any portion of an element, or any combination of elements as disclosed herein may be implemented using a processing circuit 1502. The processing circuit 1502 may include one or more processors 1504 that are controlled by some combination of hardware and software modules. Examples of processors 1504 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1504 may include specialized processors that perform specific functions, and that may be configured, augmented or controlled by one of the software modules 1516. The one or more processors 1504 may be configured through a combination of software modules 1516 loaded during initialization, and further configured by loading or unloading one or more software modules 1516 during operation.

In the illustrated example, the processing circuit 1502 may be implemented with a bus architecture, represented generally by the bus 1510. The bus 1510 may include any number of interconnecting buses and bridges depending on the specific application of the processing circuit 1502 and the overall design constraints. The bus 1510 links together various circuits including the one or more processors 1504, and storage 1506. Storage 1506 may include memory devices and mass storage devices, and may be referred to herein as computer-readable media and/or processor-readable media. The bus 1510 may also link various other circuits such as timing sources, timers, peripherals, voltage regulators, and power management circuits. A bus interface 1508 may provide an interface between the bus 1510 and one or more transceivers or interfaces 1512*a*, 1512*b*. A transceiver or interface 1512*a*, 1512*b* may be provided for each networking technology supported by the processing circuit 1502. In some instances, multiple networking technologies may share some or all of the circuitry or processing modules found in a transceiver or interface 1512*a*, 1512*b*. Each transceiver or interface 1512*a*, 1512*b* provides a means for communicating with various other apparatus over a transmission medium. In one example, a transceiver or interface 1512*a* may be used to couple the apparatus 1500 to a multi-wire bus. In another example, a transceiver or interface 1512*b* may be used to connect the apparatus 1500 to a radio access network. Depending upon the nature of the apparatus 1500, a user interface 1518 (e.g., keypad, display, speaker, microphone, joystick) may also be provided, and may be communicatively coupled to the bus 1510 directly or through the bus interface 1508.

A processor 1504 may be responsible for managing the bus 1510 and for general processing that may include the execution of software stored in a computer-readable medium that may include the storage 1506. In this respect, the processing circuit 1502 may be used to implement any of the methods, functions and techniques disclosed herein. The storage 1506 may be used for storing data that is manipulated by the processor 1504 when executing software, and the software may be configured to implement any one of the methods disclosed herein.

One or more processors 1504 in the processing circuit 1502 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1506 or in an external computer-readable medium. The external computer-readable medium and/or storage 1506 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1506 may also include, by way of example, a carrier wave, a transmission line, and any other suitable medium for transmitting software and/or instructions that may be accessed and read by a computer. Computer-readable media and/or the storage 1506 may reside in the processing circuit 1502, in the processor 1504, external to the processing circuit 1502, or be distributed across multiple entities including the processing circuit 1502. The computer-readable medium and/or storage 1506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1506 may maintain software maintained and/or organized in loadable code segments, modules, applications, programs, etc., which may be referred to herein as software modules 1516. Each of the software modules 1516 may include instructions and data that, when installed or loaded on the processing circuit 1502 and executed by the one or more processors 1504, contribute to a run-time image 1514 that controls the operation of the one or more processors 1504. When executed, certain instructions may cause the processing circuit 1502 to perform functions in accordance with certain methods, algorithms and processes described herein.

Some of the software modules 1516 may be loaded during initialization of the processing circuit 1502, and these software modules 1516 may configure the processing circuit 1502 to enable performance of the various functions disclosed herein. For example, some software modules 1516 may configure internal devices and/or logic circuits 1522 of the processor 1504, and may manage access to external devices such as a transceiver or interface 1512a, 1512b, the bus interface 1508, the user interface 1518, timers, mathematical coprocessors, and so on. The software modules 1516 may include a control program and/or an operating system that interacts with interrupt handlers and device drivers, and that controls access to various resources provided by the processing circuit 1502. The resources may include memory, processing time, access to a transceiver or interface 1512a, 1512b, the user interface 1518, and so on.

One or more processors 1504 of the processing circuit 1502 may be multifunctional, whereby some of the software modules 1516 are loaded and configured to perform different functions or different instances of the same function. The one or more processors 1504 may additionally be adapted to manage background tasks initiated in response to inputs from the user interface 1518, the transceiver or interface 1512a, 1512b, and device drivers, for example. To support the performance of multiple functions, the one or more processors 1504 may be configured to provide a multitasking environment, whereby each of a plurality of functions is implemented as a set of tasks serviced by the one or more processors 1504 as needed or desired. In one example, the multitasking environment may be implemented using a timesharing program 1520 that passes control of a processor 1504 between different tasks, whereby each task returns control of the one or more processors 1504 to the timesharing program 1520 upon completion of any outstanding operations and/or in response to an input such as an interrupt. When a task has control of the one or more processors 1504, the processing circuit 1502 is effectively specialized for the purposes addressed by the function associated with the controlling task. The timesharing program 1520 may include an operating system, a main loop that transfers control on a round-robin basis, a function that allocates control of the one or more processors 1504 in accordance with a prioritization of the functions, and/or an interrupt driven main loop that responds to external events by providing control of the one or more processors 1504 to a handling function.

Figure 16:
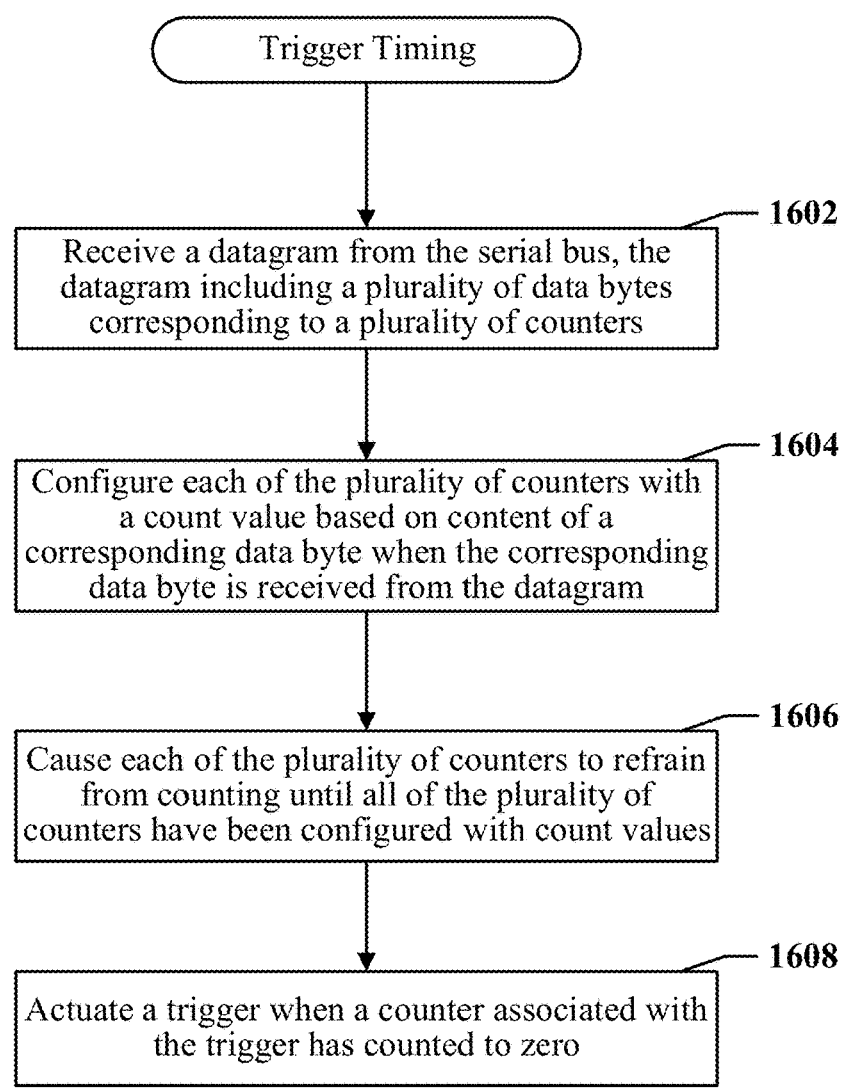
FIG. 16 is a flowchart that illustrates a method that may be performed by a master device coupled to a serial bus in accordance with certain aspects disclosed herein.

FIG. 16 is a flowchart 1600 of a method for managing triggering that may be performed by a device coupled to a serial bus. In one example, the serial bus may be operated in accordance with an RFFE protocol. At block 1602, the device may receive a datagram from the serial bus, the datagram including a plurality of data bytes corresponding to a plurality of counters. At block 1604, the device may configure each of the plurality of counters with a count value based on content of a corresponding data byte when the corresponding data byte is received from the datagram. At block 1606, the device may cause each of the plurality of counters to refrain from counting until all of the plurality of counters have been configured with count values. At block 1608, the device may actuate a trigger when a counter associated with the trigger has counted to zero.

In various examples, the plurality of data bytes defines a timing sequence for a plurality of triggers. Each trigger in the plurality of triggers may be actuated when an associated counter in the plurality of counters has counted to zero. The timing sequence may be configured to cause two or more triggers in the plurality of triggers to be actuated at the same time. In one example, the device may enable each of the plurality of counters to begin counting at the same time. Two or more data bytes in the plurality of data bytes have the same value.

In one example, the device may detect a BPC on the serial bus, and may enable each of the plurality of counters to count when the BPC is detected.

In some examples, the device may populate a first register with a bit pattern that identifies the members of a group of triggers. Each counter in the plurality of counters may be associated with a trigger identified as a member of the group of triggers, The device may provide a second register that indicates which counters in the plurality of counters have been configured and control state of an enable signal provided to each of the plurality of counters based on a comparison of the first register and the second register. The second register may be cleared after each trigger identified as a member of the group of triggers has been actuated.

Figure 17:
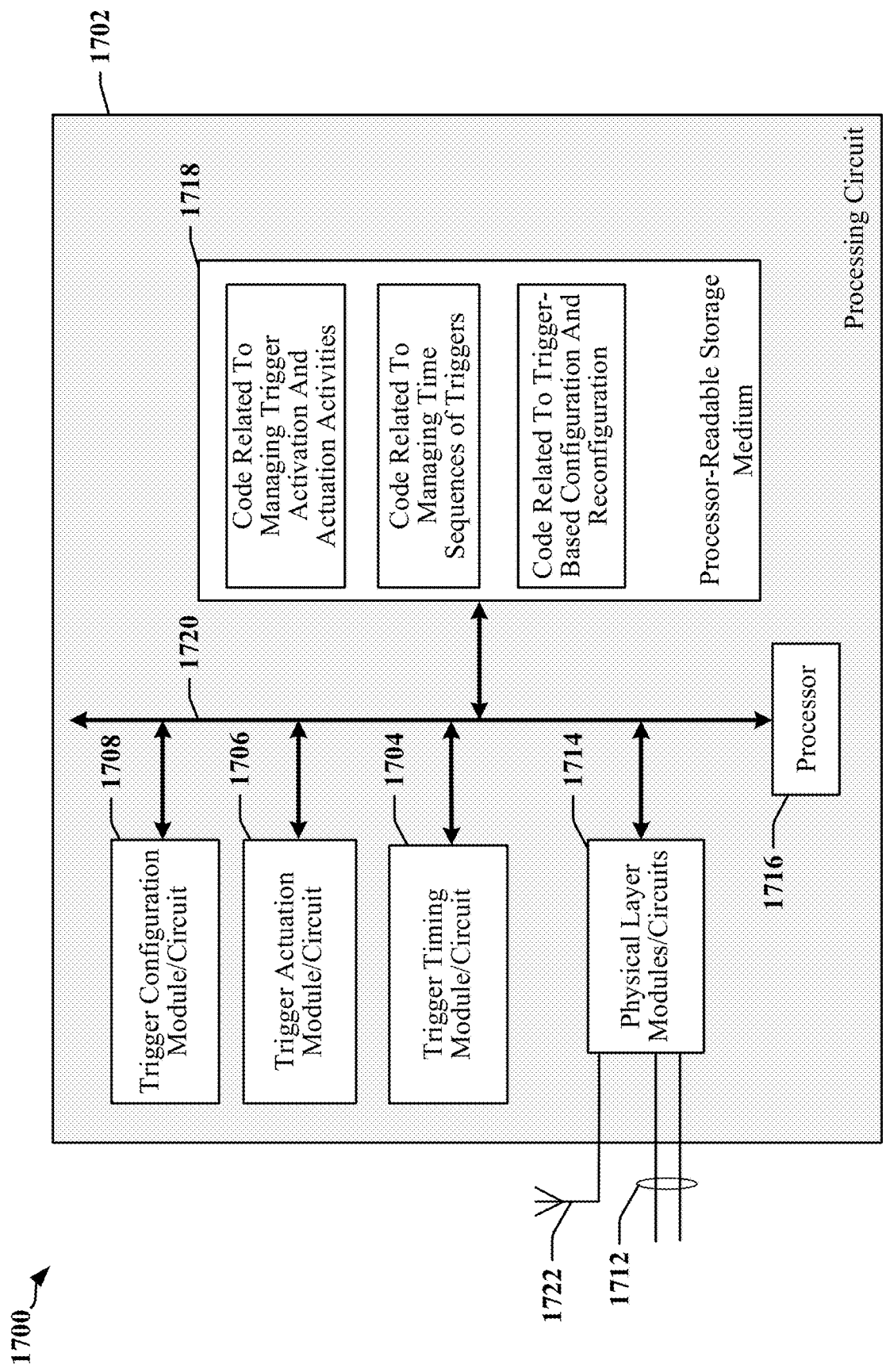
FIG. 17 illustrates a first example of a hardware implementation for an apparatus adapted in accordance with certain aspects disclosed herein.

FIG. 17 is a diagram illustrating a simplified example of a hardware implementation for an apparatus 1700 employing a processing circuit 1702. The processing circuit 1702 typically has a controller or processor 1716 that may include one or more microprocessors, microcontrollers, digital signal processors, sequencers and/or state machines. The processing circuit 1702 may be implemented with a bus architecture, represented generally by the bus 1720. The bus 1720 may include any number of interconnecting buses and bridges depending on the specific application of the processing circuit 1702 and the overall design constraints. The bus 1720 links together various circuits including one or more processors and/or hardware modules, represented by the controller or processor 1716, the modules or circuits 1704, 1706 and 1708 and the processor-readable storage medium 1718. One or more physical layer circuits and/or modules 1714 may be provided to support communications over a communication link implemented using a serial bus 1712, through an antenna or antenna array 1722 (to a radio access network for example), and so on. The bus 1720 may also link various other circuits such as timing sources, peripherals, voltage regulators, and power management circuits, which are well known in the art, and therefore, will not be described any further.

The processor 1716 is responsible for general processing, including the execution of software, code and/or instructions stored on the processor-readable storage medium 1718. The processor-readable storage medium 1718 may be implemented using a non-transitory storage medium. The software, when executed by the processor 1716, causes the processing circuit 1702 to perform the various functions described supra for any particular apparatus. The processor-readable storage medium 1718 may be used for storing data that is manipulated by the processor 1716 when executing software. The processing circuit 1702 further includes at least one of the modules 1704, 1706 and 1708. The modules 1704, 1706 and 1708 may be software modules running in the processor 1716, resident/stored in the processor-readable storage medium 1718, one or more hardware modules coupled to the processor 1716, or some combination thereof. The modules 1704, 1706 and 1708 may include microcontroller instructions, state machine configuration parameters, or some combination thereof.

In one configuration, the apparatus 1700 includes modules and/or circuits 1708 adapted to maintain configuration information relating to trigger groupings and status of counters that are used for implementing delays in corresponding triggers. The apparatus 1700 may include modules and/or circuits 1706 adapted to fire, actuate or activate triggers. The apparatus 1700 may include modules and/or circuits 1704 adapted to configure, manage, enable and otherwise control operation of the counters that are used for implementing delays in corresponding triggers.

In one example, the apparatus 1700 includes physical layer circuits and/or modules 1714 that implement an interface circuit adapted to couple the apparatus 1700 to a serial bus 1712 and that are configured to receive a clock signal from the serial bus 1712. The apparatus 1700 may have a controller and a plurality of counters configured to count pulses in the clock signal. The controller may be configured to receive a datagram from the serial bus, the datagram including a plurality of data bytes corresponding to the plurality of counters, configure each of the plurality of counters with a count value based on content of a corresponding data byte when the corresponding data byte is received from the datagram, cause each of the plurality of counters to refrain from counting until all of the plurality of counters have been configured with count values, and actuate a trigger when a counter associated with the trigger has counted to zero. The datagram may be configured in accordance with RFFE protocols, for example.

In one example, the plurality of data bytes defines a timing sequence for a plurality of triggers. In various examples, each trigger in the plurality of triggers is actuated when an associated counter in the plurality of counters has counted to zero. The timing sequence may be configured to cause two or more triggers in the plurality of triggers to be actuated at the same time. The controller may be further configured to enable each of the plurality of counters to begin counting at the same time.

In one example, the interface circuit is further configured to detect a BPC on the serial bus. The controller may be further configured to enable each of the plurality of counters to count when the BPC is detected.

In certain examples, the apparatus 1700 includes a first register populated with a bit pattern that identifies the members of a group of triggers, and a second register configured to indicate which counters in the plurality of counters have been configured. Each counter in the plurality of counters may be associated with a trigger identified as a member of the group of triggers. The apparatus 1700 may include a comparator configured to compare the first register and the second register and to control state of an enable signal provided to each of the plurality of counters based on a comparison of the first register and the second register. The second register may be cleared after each trigger identified as a member of the group of triggers has been actuated. In some instances, two or more data bytes in the plurality of data bytes have the same value. The The processor-readable storage medium 1718 may include instructions that cause the processing circuit 1702 to receive a datagram from the serial bus, the datagram including a plurality of data bytes corresponding to a plurality of counters, configure each of the plurality of counters with a count value based on content of a corresponding data byte when the corresponding data byte is received from the datagram, cause each of the plurality of counters to refrain from counting until all of the plurality of counters have been configured with count values, and actuate a trigger when a counter associated with the trigger has counted to zero. The datagram may be configured in accordance with RFFE protocols, for example.

In one example, the plurality of data bytes defines a timing sequence for a plurality of triggers. In various examples, each trigger in the plurality of triggers is actuated when an associated counter in the plurality of counters has counted to zero. The timing sequence may be configured to cause two or more triggers in the plurality of triggers to be actuated at the same time. In some examples, the processor-readable storage medium 1718 includes further instructions that cause the processing circuit 1702 to enable each of the plurality of counters to begin counting at the same time.

In one example, the processor-readable storage medium 1718 includes further instructions that cause the processing circuit 1702 to detect a BPC on the serial bus, and to enable each of the plurality of counters to count when the BPC is detected.

In some examples, the processor-readable storage medium 1718 includes further instructions that cause the processing circuit 1702 to populate a first register with a bit pattern that identifies the members of a group of triggers. Each counter in the plurality of counters may be associated with a trigger identified as a member of the group of triggers. The processor-readable storage medium 1718 may include further instructions that cause the processing circuit 1702 to provide a second register that indicates which counters in the plurality of counters have been configured, and control state of an enable signal provided to each of the plurality of counters based on a comparison of the first register and the second register. The second register may be cleared after each trigger identified as a member of the group of triggers has been actuated. Two or more data bytes in the plurality of data bytes may have the same value.

Some implementation examples are described in the following numbered clauses:

1. A method for managing triggering in a device coupled to a serial bus, comprising:
   receiving a datagram from the serial bus, the datagram including a plurality of data bytes corresponding to a plurality of counters;
   configuring each of the plurality of counters with a count value based on content of a corresponding data byte when the corresponding data byte is received from the datagram;
   causing each of the plurality of counters to refrain from counting until all of the plurality of counters have been configured with count values; and actuating a trigger when a counter associated with the trigger has counted to zero.
2. The method of clause 1, wherein the plurality of data bytes defines a timing sequence for a plurality of triggers.
3. The method of clause 2, wherein each trigger in the plurality of triggers is actuated when an associated counter in the plurality of counters has counted to zero.
4. The method of clause 2 or clause 3, wherein the timing sequence is configured to cause two or more triggers in the plurality of triggers to be actuated at a same time.
5. The method of any of clauses 1-4, further comprising:
   enabling each of the plurality of counters to begin counting at a same time.
6. The method of any of clauses 1-5, further comprising:
   detecting a bus park condition (BPC) on the serial bus; and
   enabling each of the plurality of counters to count when the BPC is detected.
7. The method of any of clauses 1-5, further comprising:
   populating a first register with a bit pattern that identifies members of a group of triggers, wherein each counter in the plurality of counters is associated with a trigger identified as a member of the group of triggers;
   providing a second register that indicates which counters in the plurality of counters have been configured; and
   controlling state of an enable signal provided to each of the plurality of counters based on a comparison of the first register and the second register.
8. The method of clause 7, wherein the second register is cleared after each trigger identified as a member of the group of triggers has been actuated.
9. The method of any of clauses 1-8, wherein two or more data bytes in the plurality of data bytes have a same value.
10. The method of any of clauses 1-9, wherein the datagram is configured in accordance with a Radio Frequency Front-End (RFFE) protocol.
11. A data communication apparatus comprising:
    an interface circuit configured to couple the data communication apparatus to a serial bus and configured to receive a clock signal from the serial bus;
    a plurality of counters configured to count pulses in the clock signal; and a controller configured to:
    receive a datagram from the serial bus, the datagram including a plurality of data bytes corresponding to the plurality of counters;
    configure each of the plurality of counters with a count value based on content of a corresponding data byte when the corresponding data byte is received from the datagram;
    cause each of the plurality of counters to refrain from counting until all of the plurality of counters have been configured with count values; and
    actuate a trigger when a counter associated with the trigger has counted to zero.
12. The data communication apparatus of clause 11, wherein the plurality of data bytes defines a timing sequence for a plurality of triggers.
13. The data communication apparatus of clause 12, wherein each trigger in the plurality of triggers is actuated when an associated counter in the plurality of counters has counted to zero.
14. The data communication apparatus of clause 12 or clause 13, wherein the timing sequence is configured to cause two or more triggers in the plurality of triggers to be actuated at a same time.
15. The data communication apparatus of any of clauses 11-14, wherein the controller is further configured to:
    enable each of the plurality of counters to begin counting at a same time.
16. The data communication apparatus of any of clauses 11-15, wherein the interface circuit is further configured to detect a bus park condition (BPC) on the serial bus, and wherein the controller is further configured to enable each of the plurality of counters to count when the BPC is detected.
17. The data communication apparatus of any of clauses 11-15, further comprising:
    a first register populated with a bit pattern that identifies members of a group of triggers, wherein each counter in the plurality of counters is associated with a trigger identified as a member of the group of triggers;
    a second register configured to indicate which counters in the plurality of counters have been configured; and
    a comparator configured to compare the first register and the second register and to control state of an enable signal provided to each of the plurality of counters based on a comparison of the first register and the second register.
18. The data communication apparatus of clause 17, wherein the second register is cleared after each trigger identified as a member of the group of triggers has been actuated.
19. The data communication apparatus of any of clauses 11-18, wherein two or more data bytes in the plurality of data bytes have a same value.
20. The data communication apparatus of any of clauses 11-19, wherein the datagram is configured in accordance with a Radio Frequency Front-End (RFFE) protocol.
21. A non-transitory processor-readable storage medium having one or more instructions which, when executed by at least one processor of a processing circuit in a receiver, cause the at least one processor to:
    receive a datagram from a serial bus, the datagram including a plurality of data bytes corresponding to a plurality of counters;
    configure each of the plurality of counters with a count value based on content of a corresponding data byte when the corresponding data byte is received from the datagram;

cause each of the plurality of counters to refrain from counting until all of the plurality of counters have been configured with count values; and actuate a trigger when a counter associated with the trigger has counted to zero.

22. The storage medium of clause 21, wherein the plurality of data bytes defines a timing sequence for a plurality of triggers, wherein each trigger in the plurality of triggers is actuated when an associated counter in the plurality of counters has counted to zero.

23. The storage medium of clause 22, wherein the timing sequence is configured to cause two or more triggers in the plurality of triggers to be actuated at a same time, and wherein each of the plurality of counters is configured to begin counting at a same time.

24. The storage medium of any of clauses 21-23, where further instructions cause the at least one processor to:
detect a bus park condition (BPC) on the serial bus; and
enable each of the plurality of counters to count when the BPC is detected.

25. The storage medium of any of clauses 21-23, where further instructions cause the at least one processor to:
populate a first register with a bit pattern that identifies members of a group of triggers, wherein each counter in the plurality of counters is associated with a trigger identified as a member of the group of triggers;
provide a second register that indicates which counters in the plurality of counters have been configured; and
control state of an enable signal provided to each of the plurality of counters based on a comparison of the first register and the second register, wherein the second register is cleared.

26. The storage medium of any of clauses 21-25, wherein two or more data bytes in the plurality of data bytes have a same value.

27. The storage medium of any of clauses 21-26, wherein the datagram is configured in accordance with a Radio Frequency Front-End (RFFE) protocol.

28. A data communication apparatus comprising:
means for receiving a datagram from a serial bus, the datagram including a plurality of data bytes corresponding to a plurality of counters;
means for controlling the plurality of counters, each of the plurality of counters being configured with a count value based on content of a corresponding data byte when the corresponding data byte is received from the datagram, wherein the means for controlling the plurality of counters is configured to cause each of the plurality of counters to refrain from counting until all of the plurality of counters have been configured with count values; and
means for actuating a trigger when a counter associated with the trigger has counted to zero.

29. The data communication apparatus of clause 28, further comprising:
means for detecting a bus park condition (BPC) on the serial bus, wherein the means for controlling the plurality of counters is further configured to enable each of the plurality of counters to count when the BPC is detected.

30. The data communication apparatus of clause 28, further comprising:
a first register populated with a bit pattern that identifies members of a group of triggers, wherein each counter in the plurality of counters is associated with a trigger identified as a member of the group of triggers; and
a second register configured to indicate which counters in the plurality of counters have been configured, wherein the means for controlling the plurality of counters is further configured to control state of an enable signal provided to each of the plurality of counters based on a comparison of the first register and the second register.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The invention claimed is:

1. A method for managing triggering in a device coupled to a serial bus, comprising:
receiving a datagram from the serial bus, the datagram including a plurality of data bytes corresponding to a plurality of counters;
configuring each counter in the plurality of counters with a count value based on content of a corresponding data byte in the datagram, wherein each counter is loaded with its respective count value after a valid parity bit for the corresponding data byte is received from the serial bus;
causing each counter in the plurality of counters to refrain from counting until all counters in the plurality of counters have been loaded with their respective count values; and
actuating a trigger when a counter associated with the trigger has counted to zero.

2. The method of claim 1, wherein the plurality of data bytes defines a timing sequence for a plurality of triggers.

3. The method of claim 2, wherein each trigger in the plurality of triggers is actuated when an associated counter in the plurality of counters has counted to zero.

4. The method of claim 2, wherein the timing sequence is configured to cause two or more triggers in the plurality of triggers to be actuated at a same time.

5. The method of claim 1, further comprising:
enabling each counter in the plurality of counters to begin counting at a same time.

6. The method of claim 1, further comprising:
detecting a bus park condition (BPC) on the serial bus; and
enabling each counter in the plurality of counters to count when the BPC is detected.

7. The method of claim 1, further comprising:
populating a first register with a bit pattern that identifies members of a group of triggers, wherein each counter in the plurality of counters is associated with a trigger identified as a member of the group of triggers;
providing a second register that indicates which counters in the plurality of counters have been configured; and
controlling state of an enable signal provided to each counter in the plurality of counters based on a comparison of the first register and the second register.

8. The method of claim 7, wherein the second register is cleared after each trigger identified as a member of the group of triggers has been actuated.

9. The method of claim 1, wherein two or more data bytes in the plurality of data bytes have a same value.

10. The method of claim 1, wherein the datagram is configured in accordance with a Radio Frequency Front-End (RFFE) protocol.

11. A data communication apparatus comprising:
an interface circuit configured to couple the data communication apparatus to a serial bus and configured to receive a clock signal from the serial bus;
a plurality of counters configured to count pulses in the clock signal; and
a controller configured to:
receive a datagram from the serial bus, the datagram including a plurality of data bytes corresponding to the plurality of counters;
configure each counter in the plurality of counters with a count value based on content of a corresponding data byte in the datagram, wherein each counter is loaded with its respective count value after a valid parity bit for the corresponding data byte is received from the serial bus;
cause each counter in the plurality of counters to refrain from counting until all counters in the plurality of counters have been loaded with their respective count values; and
actuate a trigger when a counter associated with the trigger has counted to zero.

12. The data communication apparatus of claim 11, wherein the plurality of data bytes defines a timing sequence for a plurality of triggers.

13. The data communication apparatus of claim 12, wherein each trigger in the plurality of triggers is actuated when an associated counter in the plurality of counters has counted to zero.

14. The data communication apparatus of claim 12, wherein the timing sequence is configured to cause two or more triggers in the plurality of triggers to be actuated at a same time.

15. The data communication apparatus of claim 11, wherein the controller is further configured to:
enable each counter in the plurality of counters to begin counting at a same time.

16. The data communication apparatus of claim 11, wherein the interface circuit is further configured to detect a bus park condition (BPC) on the serial bus, and wherein the controller is further configured to enable each counter in the plurality of counters to count when the BPC is detected.

17. The data communication apparatus of claim 11, further comprising:
a first register populated with a bit pattern that identifies members of a group of triggers, wherein each counter in the plurality of counters is associated with a trigger identified as a member of the group of triggers;
a second register configured to indicate which counters in the plurality of counters have been configured; and
a comparator configured to compare the first register and the second register and to control state of an enable signal provided to each counter in the plurality of counters based on a comparison of the first register and the second register.

18. The data communication apparatus of claim 17, wherein the second register is cleared after each trigger identified as a member of the group of triggers has been actuated.

19. The data communication apparatus of claim 11, wherein two or more data bytes in the plurality of data bytes have a same value.

20. The data communication apparatus of claim 11, wherein the datagram is configured in accordance with a Radio Frequency Front-End (RFFE) protocol.

21. A non-transitory processor-readable storage medium having one or more instructions which, when executed by at least one processor of a processing circuit in a receiver, cause the at least one processor to:
receive a datagram from a serial bus, the datagram including a plurality of data bytes corresponding to a plurality of counters;
configure each counter in the plurality of counters with a count value based on content of a corresponding data byte in the datagram, wherein each counter is loaded with its respective count value after a valid parity bit for the corresponding data byte is received from the serial bus;
cause each counter in the plurality of counters to refrain from counting until all counters in the plurality of counters have been loaded with their respective count values; and
actuate a trigger when a counter associated with the trigger has counted to zero.

22. The storage medium of claim 21, wherein the plurality of data bytes defines a timing sequence for a plurality of triggers, wherein each trigger in the plurality of triggers is actuated when an associated counter in the plurality of counters has counted to zero.

23. The storage medium of claim 22, wherein the timing sequence is configured to cause two or more triggers in the plurality of triggers to be actuated at a same time, and wherein each counter in the plurality of counters is configured to begin counting at a same time.

24. The storage medium of claim 21, where further instructions cause the at least one processor to:
detect a bus park condition (BPC) on the serial bus; and
enable each counter in the plurality of counters to count when the BPC is detected.

25. The storage medium of claim 21, where further instructions cause the at least one processor to:
populate a first register with a bit pattern that identifies members of a group of triggers, wherein each counter in the plurality of counters is associated with a trigger identified as a member of the group of triggers;
provide a second register that indicates which counters in the plurality of counters have been configured; and control state of an enable signal provided to each counter in the plurality of counters based on a comparison of the first register and the second register, wherein the second register is cleared after each trigger identified as a member of the group of triggers has been actuated.

26. The storage medium of claim 21, wherein two or more data bytes in the plurality of data bytes have a same value.

27. The storage medium of claim 21, wherein the datagram is configured in accordance with a Radio Frequency Front-End (RFFE) protocol.

28. A data communication apparatus comprising:

means for receiving a datagram from a serial bus, the datagram including a plurality of data bytes corresponding to a plurality of counters;

means for controlling the plurality of counters, each counter in the plurality of counters being configured with a count value based on content of a corresponding data byte in the datagram, wherein the each counter is loaded with its respective count value after a valid parity bit for the corresponding data byte is received from the serial bus, and wherein the means for controlling the plurality of counters is configured to cause each counter in the plurality of counters to refrain from counting until all counters in the plurality of counters have been loaded with their respective count values; and means for actuating a trigger when a counter associated with the trigger has counted to zero.

29. The data communication apparatus of claim 28, further comprising:

means for detecting a bus park condition (BPC) on the serial bus, wherein the means for controlling the plurality of counters is further configured to enable each counter in the plurality of counters to count when the BPC is detected.

30. The data communication apparatus of claim 28, further comprising:

a first register populated with a bit pattern that identifies members of a group of triggers, wherein each counter in the plurality of counters is associated with a trigger identified as a member of the group of triggers; and a second register configured to indicate which counters in the plurality of counters have been configured, wherein the means for controlling the plurality of counters is further configured to control state of an enable signal provided to each counter in the plurality of counters based on a comparison of the first register and the second register.

* * * * *